United States Patent
Yan et al.

(10) Patent No.: US 12,051,934 B2
(45) Date of Patent: Jul. 30, 2024

(54) METHOD FOR CHARGING BATTERY, CHARGING AND DISCHARGING DEVICE

(71) Applicant: CONTEMPORARY AMPEREX TECHNOLOGY CO., LIMITED, Ningde (CN)

(72) Inventors: Yu Yan, Ningde (CN); Xiyang Zuo, Ningde (CN); Zhimin Dan, Ningde (CN); Haili Li, Ningde (CN); Shan Huang, Ningde (CN); Shichao Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 440 days.

(21) Appl. No.: 17/563,513

(22) Filed: Dec. 28, 2021

(65) Prior Publication Data
US 2023/0031352 A1 Feb. 2, 2023

Related U.S. Application Data

(63) Continuation of application No. PCT/CN2021/109367, filed on Jul. 29, 2021.

(51) Int. Cl.
*H02J 7/00* (2006.01)
*B60L 50/60* (2019.01)
(Continued)

(52) U.S. Cl.
CPC .......... *H02J 7/00714* (2020.01); *B60L 50/60* (2019.02); *B60L 58/12* (2019.02); *H01M 10/425* (2013.01);
(Continued)

(58) Field of Classification Search
None
See application file for complete search history.

(56) References Cited

U.S. PATENT DOCUMENTS 9,793,733 B2   10/2017  Hempel
10,491,025 B1* 11/2019  Ebrahimzadeh .. H01M 10/0525
(Continued)

FOREIGN PATENT DOCUMENTS

CN    101617454 B    10/2012
CN    104040823 A     9/2014
(Continued)

OTHER PUBLICATIONS

Request for the Submission of an Opinion dated Feb. 21, 2024 received in Korean Patent Application No. KR 10-2021-7040290.
(Continued)

*Primary Examiner* — Samuel Berhanu
(74) *Attorney, Agent, or Firm* — Scully, Scott, Murphy & Presser, P.C.

(57) ABSTRACT

Embodiments of the application provide a method for charging battery a charging and discharging device, which can ensure the safety performance of the battery. The charging and discharging device includes a first DC/DC converter, a unidirectional AC/DC converter and a control unit, where the first DC/DC converter is a unidirectional DC/DC converter, and the control unit is configured to: receive a first charging current and control the unidirectional AC/DC converter and the first DC/DC converter to charge a battery through an AC power source based on the first charging current; receive a first discharging current, and control the battery to release power based on the first discharging current; and receive a second charging current, and control the unidirectional AC/DC converter and the first DC/DC
(Continued)

converter to charge the battery through the AC power source based on the second charging current.

20 Claims, 12 Drawing Sheets

(51) Int. Cl.
*B60L 58/12* (2019.01)
*H01M 10/42* (2006.01)
(52) U.S. Cl.
CPC ......... *H02J 7/0048* (2020.01); *B60L 2210/10* (2013.01); *B60L 2210/30* (2013.01); *H01M 2010/4271* (2013.01)

(56) References Cited

U.S. PATENT DOCUMENTS

| | | | |
|---|---|---|---|
| 2010/0289457 A1 | 11/2010 | Onnerud et al. | |
| 2013/0049676 A1* | 2/2013 | Ishikawa | B60L 53/53 320/103 |
| 2014/0327406 A1 | 11/2014 | Hempel | |
| 2017/0106764 A1 | 4/2017 | Beaston et al. | |
| 2019/0214833 A1* | 7/2019 | Li | H02J 7/00718 |

FOREIGN PATENT DOCUMENTS

| | | |
|---|---|---|
| CN | 108032740 A | 5/2018 |
| CN | 108110349 A | 6/2018 |
| CN | 207442505 U | 6/2018 |
| CN | 108528263 A | 9/2018 |
| CN | 111279573 A | 6/2020 |
| CN | 111381171 A | 7/2020 |
| JP | 2014158415 A | 8/2014 |
| KR | 20150108825 A | 9/2015 |
| WO | 2020124521 A1 | 6/2020 |

OTHER PUBLICATIONS

Notice of Preliminary Rejection dated Aug. 14, 2023 received in Korean Patent Application No. KR 10-2021-7010290.
Notice of Reasons for Refusal dated Oct. 23, 2023 received in Japanese Patent Application No. JP 2021-575015.
Extended European Search Report dated Nov. 23, 2022 received in European Patent Application No. EP 21819322.5.

* cited by examiner

METHOD FOR CHARGING BATTERY, CHARGING AND DISCHARGING DEVICE

CROSS-REFERENCE TO RELATED APPLICATIONS

The present application is a continuation of International Application No. PCT/CN2021/109367, filed on Jul. 29, 2021, which is hereby incorporated by reference in its entirety.

TECHNICAL FIELD

The present application relates to the field of batteries, in particular to a method for charging a battery and a charging and discharging device.

BACKGROUND

With the development of the times, electric vehicles have huge market prospects and can effectively promote energy saving and emission reduction, which is beneficial to the development and progress of society due to their high environmental protection, low noise, low cost of use, and other advantages.

For electric vehicles and related fields, battery technology is an important factor related to their development, especially the safety performance of batteries, which affects the development and application of battery-related products and the acceptance of electric vehicles by the public. Therefore, how to ensure the safety performance of the battery is a technical problem to be solved.

SUMMARY

Embodiments of the application provide a method for charging a battery and a charging and discharging device, which can ensure the safety performance of the battery.

In a first aspect, a charging and discharging device is provided. The charging and discharging device includes a first direct current/direct current (DC/DC) converter, a unidirectional alternating current/direct current (AC/DC) converter and a control unit, where the first DC/DC converter is a unidirectional DC/DC converter, and the control unit is configured to: receive a first charging current sent by a battery management system (BMS) of a battery, and control the unidirectional AC/DC converter and the first DC/DC converter to charge the battery through an alternative current (AC) power source based on the first charging current; receive a first discharging current sent by the BMS, and control the battery to release power based on the first discharging current, where the first discharging current is a discharging current sent by the BMS when a first cumulative charge amount of the battery is greater than or equal to a first cumulative charge amount threshold and a voltage of a battery cell of the battery does not exceed a full charge voltage of the battery cell; and receive a second charging current sent by the BMS, and control the unidirectional AC/DC converter and the first DC/DC converter to charge the battery through the AC power source based on the second charging current, where the second charging current is a charging current sent by the BMS when a first cumulative discharge amount of the battery is greater than or equal to a first cumulative discharge amount threshold.

In the embodiments of the present application, in the process of charging the battery, the charging and discharging device can realize charging and discharging of the battery based on the first charging current and the first discharging current sent by the BMS, thereby avoiding the problems of heating and lithium ion accumulation caused by continuous charging of the battery, and then avoiding the safety problems of the battery caused by heating and lithium ion accumulation, such as burning or explosion of the battery, and ensuring the safety performance of the battery.

Further, the charging and discharging device includes a unidirectional AC/DC converter and a unidirectional DC/DC converter, namely, the structure of the charging and discharging device of the embodiments of the application is the same as that of the existing charging pile, so that the charging and discharging of the battery can be realized without changing the prior charging pile structure, and the charging cost is greatly reduced.

In some possible embodiments, the control unit is further configured to: receive a second discharging current sent by the BMS, and control the battery to release power based on the second discharging current, where the second discharging current is a discharging current sent by the BMS when a second cumulative charge amount of the battery is greater than or equal to a second cumulative charge amount threshold and the voltage of the battery cell of the battery does not exceed the full charge voltage of the battery cell.

According to the above technical solution, the charging and discharging device can further discharge the battery again after completing the charging, discharging and recharging of the battery through an information interaction between the charging and discharging device and the BMS. In this way, the charging and discharging device of the embodiment of the present application can charge and discharge the battery several times, i.e., the charging and discharging processes are cycled sequentially to achieve a gradual charging of the battery on the basis of ensuring the performance of the battery.

In some possible embodiments, the control unit is further configured to: receive a charge stop command sent by the BMS: and control, based on the charge stop command, the unidirectional AC/DC converter and the first DC/DC converter to cause the AC power source to stop charging the battery, where the charge stop command is a command sent by the BMS when the voltage of the battery cell of the battery exceeds the full charge voltage.

In some possible embodiments, the charging and discharging device further includes a second DC/DC converter; and the control unit is specifically configured to control, based on the first discharging current, the second DC/DC converter to release the power of the battery into an energy storage unit.

According to the above technical solution, the power of the battery is released into the energy storage unit, so that the energy storage unit can perform other operations based on the received power, thus avoiding the waste of power. In addition, the charging and discharging device of the embodiments of the present application adds a second DC/DC converter on the basis of the existing charging pile, which is a small modification to the existing charging pile and helps to reduce the cost.

In some possible embodiments, the second DC/DC converter is a bidirectional DC/DC converter, and the control unit is further configured to: control the second DC/DC converter to charge the battery through the energy storage unit while controlling the unidirectional AC/DC converter and the first DC/DC converter to charge the battery through the AC power source based on the first charging current; and/or control the second DC/DC converter to charge the battery through the energy storage unit while controlling the unidirectional AC/DC converter and the first DC/DC converter to charge the battery through the AC power source based on the second charging current.

According to the above technical solution, the energy storage unit can not only receive the power released by the battery, but can also charge the battery. On the one hand, it avoids the problem of not being able to continue releasing the power from the battery to the energy storage unit because the power in the energy storage unit has reached the full amount, and ensures that the charging process is carried out normally. On the other hand, the energy storage unit charges the battery by using the received power released by the battery, which realizes the recycling of the battery power and saves electric energy. On yet another hand, the AC power source and the energy storage unit charge the battery at the same time, which is beneficial to improve the charging rate of the battery and save the charging time.

In some possible embodiments, a first charging power of the energy storage unit to charge the battery is determined according to a discharge capability of the energy storage unit, and a second charging power of the AC power source to charge the battery is a difference between a charging demand power of the battery and the first charging power.

In some possible embodiments, the control unit is specifically configured to: acquire a battery state of charge (SOC) the energy storage unit: under a condition that the SOC is greater than a SOC threshold, control the second DC/DC converter to charge the battery through the energy storage unit, and control the unidirectional AC/DC converter and the first DC/DC converter to charge the battery through the AC power source based on the first charging current; and/or under a condition that the SOC is greater than a SOC threshold, control the second DC/DC converter to charge the battery through the energy storage unit, and control the unidirectional AC/DC converter and the first DC/DC converter to charge the battery through the AC power source based on the second charging current.

According to the above technical solution, whether the energy storage unit is used to assist the AC power source to charge the battery together is determined according to the SOC of the energy storage unit, so that the charging efficiency of the charging and discharging device can be improved when the power stored by the energy storage unit is sufficient.

In some possible embodiments, a charging rate of the first charging current and/or the second charging current ranges from 2C to 10C.

According to the technical solution, on the basis of ensuring the safety performance of the battery, the charging rate of the first charging current and/or the second charging current ranges from 2C to 10C, thus realizing the purpose of fast charging with large current, thereby improving the charge amount of the battery in the single charging process, greatly reducing the charging time of the battery and improving the user experience.

Further, limited by the accumulation of lithium ions at the negative electrode during continuous charging, the charging current is also limited, therefore, it is impossible to use continuous large current to realize rapid charging of the battery, according to the technical solution of the embodiment of the present application, the battery is charged by using a large current, and the battery is discharged after a large current charging, so as to release lithium ions accumulated in the negative electrode of the battery during the charging process, and then the battery can be recharged by using a large current to realize rapid charging of the battery.

In some possible embodiments, a discharging rate of the first discharging current ranges from 0.1C to 1C.

According to the technical solution, the discharging rate of the first discharging current ranges from 0.1 C to 1C to achieve small current discharge, aiming at releasing lithium ions gathered in the negative electrode of the battery through the discharge of the battery with small current, without causing excessive loss of amount of charge which has entered the battery.

In some possible embodiments, a ratio of the first cumulative discharge amount threshold to the first cumulative charge amount threshold is less than or equal to 10%.

According to the above technical solution, the ratio of the cumulative discharge amount threshold in the discharging process and the cumulative charge amount threshold in the charging process is set, so that the charge amount of the battery in the charging process and the discharge amount of the battery in the discharging process can be better controlled, so that the discharge amount is small and the excessive loss of the charged power in the battery will not be caused.

In some possible embodiments, at least one of the first charging current, the first discharging current and the second charging current is determined according to a state parameter of the battery: and where the state parameter of the battery includes at least one of the following parameters: a battery temperature, a battery voltage, a battery current, a battery SOC and a battery state of health.

According to the above technical solution, when at least one of the first charging current, the second charging current and the first discharging current is a current determined according to the state parameter of the battery, it can better adapt to the current state parameter of the battery, improve the charging efficiency and/or discharging efficiency of the battery, and will not cause damage to the battery.

In some possible embodiments, the control unit is specifically configured to: periodically receive the first charging current sent by the BMS: and/or, periodically receive the first discharging current sent by the BMS: and/or, periodically receive the second charging current sent by the BMS.

According to the above technical solution, in the process of single charging and/or single discharging of the battery by the charging and discharging device, the charging current and/or discharging current are sent periodically by the BMS. On one aspect, with the embodiments, the charging and discharging device can charge the battery through the periodically adjusted charging current and/or discharging current, in order to improve the charging and discharging efficiency. On the other hand, the charging and discharging device can also determine that the states of the BMS and the battery are normal through the periodically sent charging current and/or discharging current, so that the battery can be continuously charged or controlled to discharge, so as to ensure the safety performance of the battery.

In some possible embodiments, the control unit is further configured to: receive a first charging voltage sent by the BMS, where the first charging voltage and the first charging current are carried in a first battery charging demand message: and/or, receive a first discharging voltage sent by the BMS, where the first discharging voltage and the first discharging current are carried in a second BCL message: and/or, receive a second charging voltage sent by the BMS, where the second charging voltage and the second charging current are carried in a third BCL message.

According to the technical solution, the communication between the charging and discharging device and the BMS can be compatible with the existing communication protocol between the charging pile and the BMS, so that the communication between the charging and discharging device and the BMS is easy to realize and has a good application prospect.

In a second aspect, a method for charging a battery is provided, which is applied to the charging and discharging device including a first direct current/direct current (DC/DC) converter, a unidirectional alternating current/direct current (AC/DC) converter, the first DC/DC converter being a unidirectional DC/DC converter, the method includes: receiving a first charging current sent by a battery management system (BMS) of a battery, and controlling the unidirectional AC/DC converter and the first DC/DC converter to charge the battery through an AC power source based on the first charging current: receiving a first discharging current sent by the BMS, and controlling the battery to release power based on the first discharging current, where the first discharging current is a discharging current sent by the BMS when a first cumulative charge amount of the battery is greater than or equal to a first cumulative charge amount threshold and a voltage of a battery cell of the battery does not exceed a full charge voltage of the battery cell: and receiving a second charging current sent by the BMS, and controlling the unidirectional AC/DC converter and the first DC/DC converter to charge the battery through the AC power source based on the second charging current, where the second charging current is a charging current sent by the BMS when a first cumulative discharge amount of the battery is greater than or equal to a first cumulative discharge amount threshold.

In a third aspect, a charging and discharging device is provided, which includes a processor and a memory, the memory for storing a computer program, and the processor for calling the computer program to execute the battery charging method as in the above second aspect or its various implementations.

BRIEF DESCRIPTION OF DRAWINGS

In order to more clearly explain the technical solution of the embodiments of the present application, the drawings required for use in the embodiments of the present application will be briefly described below, and it will be apparent that the drawings described below are only some embodiments of the present application, and other drawings may be obtained from the drawings without exerting creative effort by those of ordinary skill in the art.

DESCRIPTION OF EMBODIMENTS

Implementations of the present application are described in further detail below in conjunction with the accompanying drawings and embodiments. The following detailed description of the embodiments and the accompanying drawings are used to illustrate the principles of the present application, but are not intended to limit the scope of the present application, i.e., the present application is not limited to the described embodiments.

In the description of this application, it should be noted that, unless otherwise indicated, "a plurality of" means more than two; the terms "up", "down", "left", "right", "inside", "outside" and the like indicate orientations or positional relationships for ease of description and simplification of the description only, and are not intended to indicate or imply that the device or element in question must have a particular orientation, be constructed and operated in a particular orientation and therefore cannot be construed as limiting to the present application. Furthermore, the terms "first", "second", "third", etc. are used for descriptive purposes only and cannot be understood to indicate or imply relative importance.

In the field of new energy, power battery can be used as the main power source of power consumption apparatus (such as vehicle, ship or spacecraft, etc.), while energy storage battery can be used as the charging source of power consumption apparatus, both of which are self-evident. By way of example and not limitation, in some application scenarios the power battery may be a battery in the power consumption apparatus and the energy storage battery may be a battery in a charging device. Hereinafter both the power battery and the energy storage battery may be collectively referred to as a battery for convenience of description.

At present, most of the batteries on the market are rechargeable batteries, and the most common ones are lithium batteries, such as lithium-ion batteries or lithium-ion polymer batteries. In the charging process, generally, the battery is charged by continuous charging, however, continuous charging of the battery will cause lithium plating and heat generation, which will not only degrade the performance of the battery, greatly shorten the cycle life, but also limit the fast charge capacity of the battery, and may cause disastrous consequences such as burning and explosion, resulting in serious safety problems.

In order to ensure the safety performance of the battery, the present application provides a new method for charging battery and charging system.

Figure 1:
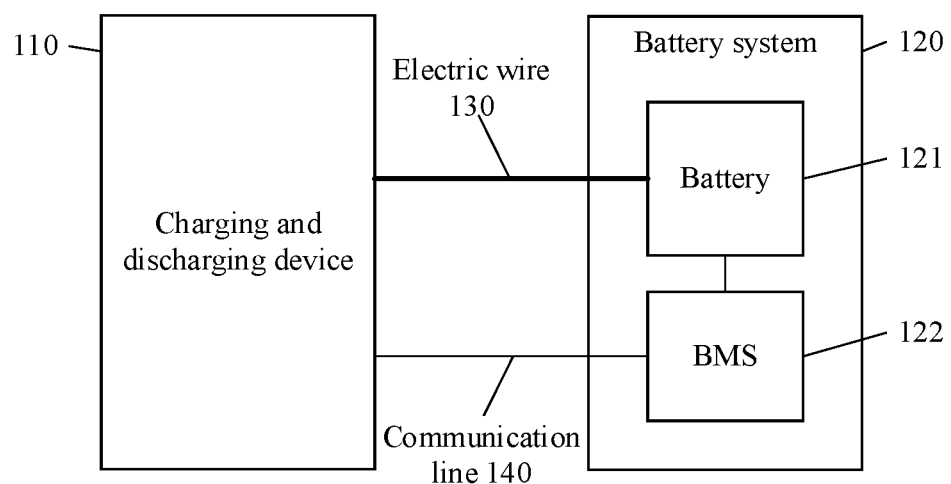
FIG. 1 is an architecture diagram of a charging system applicable to an embodiment of the present application.

FIG. 1 shows an architecture diagram of a charging system applicable to the embodiments of the present application.

As shown in FIG. 1, a charging system 100 may include a charging and discharging device 110 and a battery system 120. Optionally, the battery system 200 may be a battery system in an electric vehicle (including a pure electric vehicle and a pluggable hybrid electric vehicle) or a battery system in other application scenarios.

Optionally, at least one battery pack may be provided in the battery system 120, and the entirety of at least one battery pack may be collectively referred to as battery 121. In terms of the type of battery, the battery 121 may be any type of battery, including but not limited to: a lithium ion battery, a lithium metal battery, a lithium sulfur battery, a lead acid battery, a nickel cadmium battery, a nickel hydrogen battery, a lithium air battery, and the like. In terms of battery scale, the battery 121 in the embodiment of the present application may be a cell/battery cell, a battery module or a battery pack, each of which may be formed by a plurality of batteries in series and parallel. In the embodiments of the present application, the specific type and scale of the battery 121 are not specifically limited.

In addition, in order to intelligently manage and maintain the battery 121, prevent over-charging and over-discharging of the battery, and prolong the service life of the battery, the battery system 120 is generally provided with a battery management system (BMS) 122 for monitoring the state of the battery 121. Optionally, the BMS 122 may be integrated with the battery 121 in the same device/apparatus, or the BMS 122 may be disposed outside the battery 121 as an independent device/apparatus.

Specifically, the charging and discharging device 110 is a device for supplementing electric energy for the battery 121 in the battery system 120 and/or controlling the discharge of the battery 121.

Optionally, the charging and discharging device 110 in the embodiments of the present application may be an ordinary charging pile, a super charging pile, a charging pile supporting a vehicle to grid (V2G) mode, or a charging and/or discharging device/apparatus capable of charging and/or discharging a battery, etc. Embodiments of the present application are not limited to specific types and specific application scenarios of the charging and discharging device 110.

Optionally, as shown in FIG. 1, the charging and discharging device 110 may be connected to the battery 121 through a electric wire 130 and to the BMS 122 through a communication line 140 for realizing information interaction between the charging and discharging device 110 and the BMS.

By way of example, the communication line 140 includes, but is not limited to, a control area network (CAN) communication bus or a daisy chain communication bus.

Optionally, the charging and discharging device 110 can communicate with the BMS 122 through a wireless network in addition to the communication line 140. Embodiments of the present application are not particularly limited to the type of wired communication or the type of wireless communication between the charging and discharging device and the BMS 122.

Figure 2:
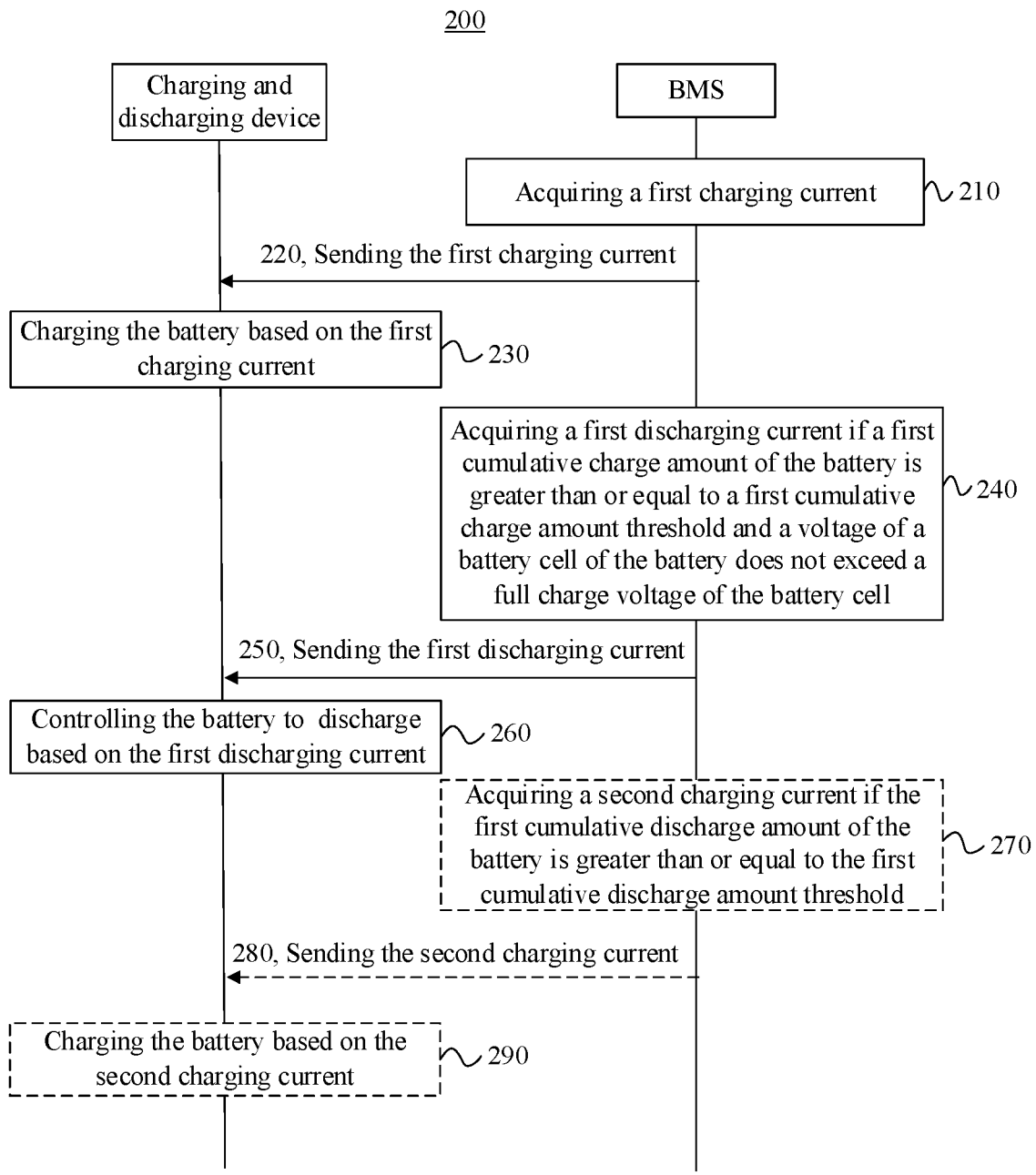
FIG. 2 is a schematic flow block diagram of a battery charging method provided by embodiments of the present application.

FIG. 2 shows a schematic flow block diagram of a battery charging method 200 according to the embodiments of the present application. Optionally, the method 200 of the embodiments of the present application may be applied to the charging and discharging device 110 and the battery system 120 shown above in FIG. 1.

As shown in FIG. 2, the battery charging method 200 may include the following steps.

Step 210: the Battery Management System BMS acquires a first charging current.

Step 220: the BMS sends the first charging current to the charging and discharging device.

Step 230: the charging and discharging device charges the battery based on the first charging current.

Step 240: if a first cumulative charge amount of the battery is greater than or equal to a first cumulative charge amount threshold and a voltage of the battery cell of the battery does not exceed the full charge voltage of the battery cell, the BMS acquires a first discharging current.

Step 250: the BMS sends a first discharging current to the charging and discharging device.

Step 260: the charging and discharging device controls the battery to be discharged based on the first discharging current.

In an embodiment of that present application, a charging method which can be realized between a charging and discharging device and a BMS is provided, in the process of charging the battery, the charging and discharging device can realize charging and discharging the battery based on the first charging current and the first discharging current sent by BMS, thus avoiding the problems of heating, lithium ion accumulation and the like caused by continues charging of the battery. As heating will cause the temperature of the battery to rise, crystals produced by lithium ion accumulation may puncture the battery, causing electrolyte leakage and short circuit of the battery. The temperature rise and short circuit of the battery may cause safety problems of the battery, such as burning or explosion of the battery. Therefore, through the technical solution of the embodiment of the present application, the charging and discharging device realizes the charging and discharging of the battery based on the first charging current and the first discharging current sent by the BMS, which can ensure the safety performance of the battery. In addition, in the process of continues charging, the continuous aggregation of lithium ions will also cause lithium precipitation problems, which will affect the service life and charge capacity of the battery. Therefore, the technical solution of the embodiment of the present application can also ensure the service life and charge capacity of the battery.

Specifically, in steps 210 to 230, the BMS may first enter a charging mode to control the charging and discharging device to charge the battery. First, the BMS acquires the first charging current, and after the BMS sends the first charging current to the charging and discharging device, the charging and discharging device charges the battery based on the received first charging current.

Optionally, the BMS may acquire the first charging current from its own functional unit (e.g., the memory unit or the processing unit), or the BMS may also acquire the first charging current from other devices. In some embodiments, the first charging current may be a preset current, the preset current may be a fixed value, or may vary over time in a preset manner. Optionally, in some other embodiments, the first charging current may also be a current determined according to a state parameter of the battery, and the first charging current varies with a change in the state parameter of the battery.

Optionally, the charging and discharging device can be connected to a power source, which can be an AC power source and/or a DC power source. After receiving the information of the first charging current, the charging and discharging device charges the battery through the AC power source and/or the DC power source based on the first charging current.

Further, when the charging and discharging device charges the battery based on the first charging current, the BMS can acquire the first cumulative charge amount of the battery and judge whether the first cumulative charge amount is greater than or equal to the first cumulative charge amount threshold. If the first cumulative charge amount of the battery is greater than or equal to the first cumulative charge amount threshold and the voltage of the battery unit does not exceed the full charge voltage of the battery unit, the BMS acquires the first discharging current.

In particular, as is known from the illustration of the battery in FIG. 1 above, the battery may include one or more battery cells, and the BMS may monitor whether the battery reaches a fully charged state by monitoring the voltages of one or more battery cells in the battery. Optionally, if the battery includes a plurality of battery cells, the voltages of the plurality of battery cells may be different, in which case it is possible to judge whether the battery reaches a full charge state by judging whether the maximum voltage of the battery cells exceeds the full charge voltage of the battery cells. Optionally, in addition to the maximum voltage of the battery cell, other voltages of the battery cell in the battery may be used to judge whether the battery reaches the full charge state.

If the first cumulative charge amount of the battery is greater than or equal to the first cumulative charge amount threshold, the BMS acquires a first discharging current, that is, for the battery, the charging mode is switched to the discharging mode on the premise that the voltage of the battery cell of the battery does not exceed the full charge voltage of the battery cell, that is, the battery does not reach the full charge state.

Optionally, the above first cumulative charge amount may be a first cumulative charge capacity or may also be a first cumulative charge power amount. Correspondingly, if the first cumulative charge amount is the first accumulative charge capacity, the first cumulative charge amount threshold is the first accumulative charge capacity threshold, if the first cumulative charge amount is the first accumulative charge power amount, the first cumulative charge amount threshold is the first accumulative charge power amount threshold.

In some embodiments, the above first cumulative charge amount threshold may be a preset threshold, the preset threshold may be a fixed threshold, or may vary over time in a preset manner.

In some other embodiments, the first cumulative charge amount threshold can also be determined according to the state parameter of the battery, that is, when the state parameter of the battery changes, the first cumulative charge amount threshold also changes accordingly. Through the implementation, the first cumulative charge amount threshold can better adapt to the current state parameter of the battery, so as to better control the current charging process, improve the charging efficiency of the battery, and will not cause damage to the battery.

Further, in steps 240 to 260, the BMS acquires a first discharging current and sends the first discharging current to the charging and discharging device, which controls the battery to be discharged based on the received first discharging current.

Optionally, the BMS may acquire the first discharging current from its own functional unit (e.g., the memory unit or the processing unit), or the BMS may also acquire the first discharging current from other devices. In some embodiments, the first discharging current may be a preset current, the preset current may be a fixed value, or may vary over time in a preset manner. Optionally, in some other embodiments, the first discharging current may also be a current determined according to a state parameter of the battery, and the first discharging current varies with a change in the state parameter of the battery. In some embodiments, electricity from the battery may be transferred to the energy storage device and/or the power grid during the discharging mode or discharging phase to facilitate the recycling of electrical energy. The energy storage device can be disposed in the charging and discharging device or outside the charging and discharging device, so as to enable the energy storage device to receive the discharging current of the battery. The embodiments of the present application do not limit the specific arrangement of the energy storage device. Optionally, in the discharging mode, the battery power can be consumed in other ways, and the embodiments of the present application do not limit the specific mode of power consumption.

Further, in the process of controlling the battery discharge by the charging and discharging device, the BMS can acquire the first cumulative discharge amount of the battery in the discharging process and judge whether the first cumulative discharge amount is greater than or equal to the first cumulative discharge amount threshold.

Optionally, the first cumulative discharge amount may be a first cumulative discharge capacity or may also be a first cumulative discharge amount. Correspondingly, if the first cumulative discharge amount is the first cumulative discharge capacity, the first cumulative discharge amount threshold is the first cumulative discharge capacity threshold, if the first cumulative discharge amount is the first cumulative discharge power amount, the first cumulative discharge amount threshold is the first cumulative discharge power amount threshold.

In some embodiments, the first cumulative discharge amount threshold may be a preset threshold, which may be a fixed threshold, or may vary over time in a preset manner.

In some other embodiments, the first cumulative discharge amount threshold can also be determined according to the state parameter of the battery, that is, when the state parameter of the battery changes, the first cumulative discharge amount threshold also changes accordingly. Through the implementation, the first cumulative discharge amount threshold can better adapt to the current state parameter of the battery, so as to better control the current discharging process, improve the discharging efficiency of the battery, and will not cause damage to the battery.

When the first cumulative discharge amount is greater than or equal to the first cumulative discharge amount threshold, the charging and discharging device controls the battery to stop discharging.

Through the above process, the charging and discharging device can realize charging and discharging of the battery based on the first charging current and the first discharging current sent by the BMS, thereby avoiding the problems of heating and lithium ion accumulation caused by continuous charging of the battery, and then avoiding the safety problems of the battery caused by heating and lithium ion accumulation, such as burning or explosion of the battery, and ensuring the safety performance of the battery. In addition, the battery is charged to the first cumulative charge amount based on the first charging current and then the power amount of the battery is released to the first cumulative discharge amount based on the first discharging current, so that lithium ions accumulated in the negative electrode of the battery during the charging process can be released, and the lithium precipitation problem generated during continuous charging can be prevented, thereby improving the service life and charging ability of the battery.

For battery charging, after one charge and one discharge, the battery can be recharged for the second time to continue charging the battery.

Optionally, as shown in FIG. 2 the battery charging method 200 in the embodiments of the present application may further include the following steps.

Step 270: if the first cumulative discharge amount of the battery is greater than or equal to the first cumulative discharge amount threshold, the BMS acquires a second charging current.

Step 280: the BMS sends the second charging current to the charging and discharging device.

Step 290: the charging and discharging device charges the battery based on the second charging current.

Specifically, in the above steps 270 to 290, when the BMS judges that the first cumulative discharge amount of the battery is greater than or equal to the first cumulative discharge amount threshold, the BMS acquires the second charging current and sends the second charging current to a charging and discharging device, and the charging and discharging device continues to charge the battery based on the received second charging current, i.e., for the battery, the charging mode is re-entered from the discharging mode. Optionally, other related technical solutions of steps 270 to 290 may be referred to above in relation to the description of steps 210 to 230 and will not be repeated here.

Understandably, in the above embodiments of the present application, in addition to the current information required for charging and discharging the battery, voltage information required for charging and discharging is also required. For example, in steps 210 to 230, the BMS acquires the first charging current and the first charging voltage, and sends the first charging current and the first charging voltage to the charging and discharging device for charging the battery based on the first charging current and the first charging voltage. In steps 240 to 260, the BMS acquires the first discharging current and the first discharging voltage and sends the first discharging current and the first discharging voltage to the charging and discharging device for discharging a battery based on the first discharging current and the first discharging voltage. The subsequent charging and discharging process can be similar to the above charging and discharging process and will not be described here.

Figure 3:
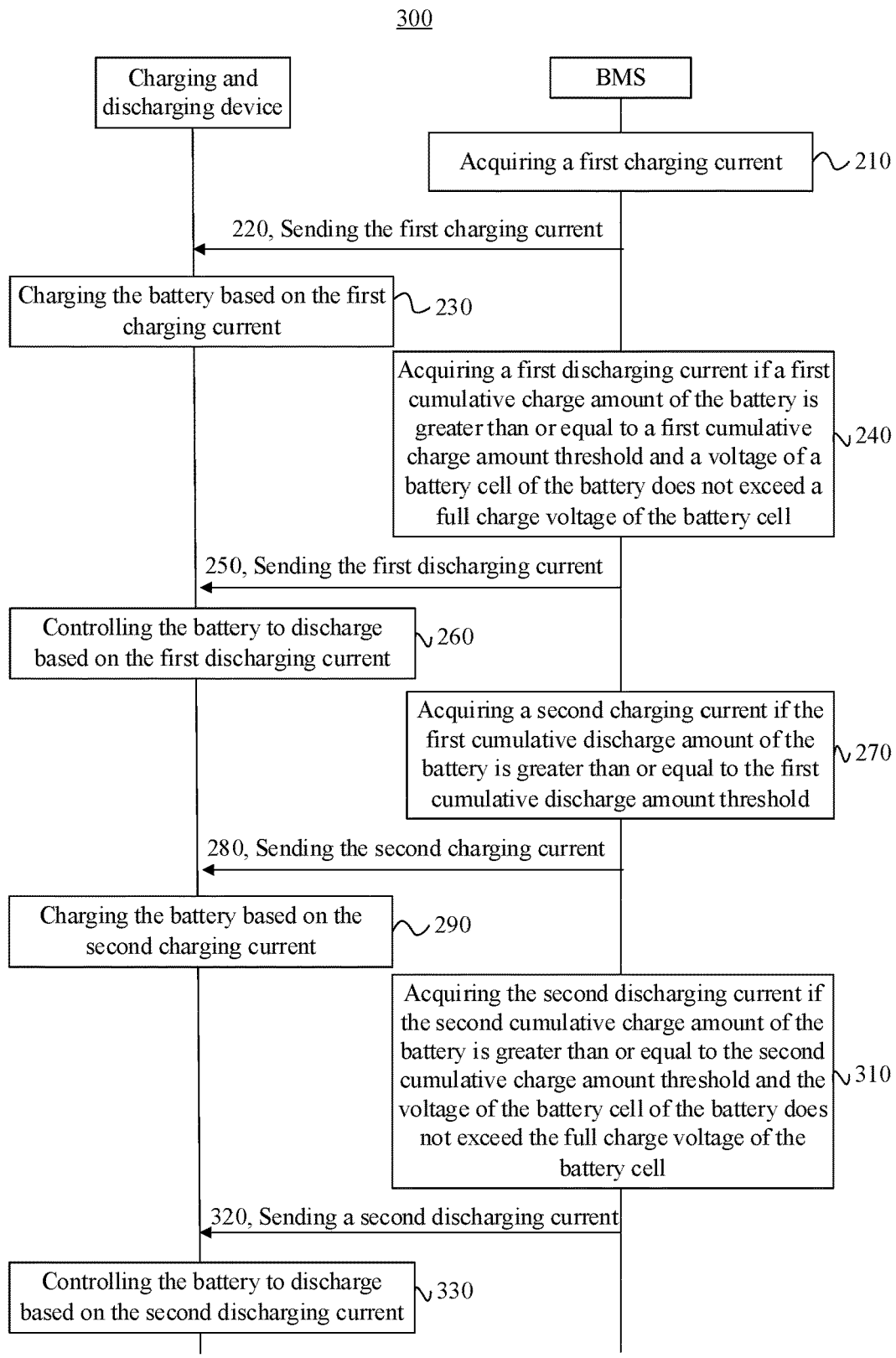
FIG. 3 is a schematic flow block diagram of another battery charging method provided by embodiments of the present application.

FIG. 3 is a schematic flow block diagram of another battery charging method 300 of the embodiments of the present application.

As shown in FIG. 3, the battery charging method 300 may further include the following steps in addition to steps 210 to 290 described above.

Step 310: if the second cumulative charge amount of the battery is greater than or equal to the second cumulative charge amount threshold and the voltage of the battery cell of the battery does not exceed the full charge voltage of the battery cell, the BMS acquires the second discharging current.

Step 320: the BMS sends the second discharging current to the charging and discharging device.

Step 330: the charging and discharging device controls the battery to be discharged based on the second discharging current.

In the embodiment of the present application, the charging, discharging, recharging and re-discharging of the battery are completed through the information interaction between the BMS and the charging and discharging device. In this way, the embodiments of the present application can further provide a charging and discharging method with multiple cycles, wherein the charging and discharging processes are cyclically carried out in turn, and the gradual charging of the battery is realized on the basis of ensuring the safety performance of the battery.

Specifically, in step 310, when the charging and discharging device charges the battery based on the second charging current, the BMS can acquire the second cumulative charge amount of the battery and judge whether the second cumulative charge amount is greater than or equal to the second cumulative charge amount threshold.

Optionally, the second cumulative charge amount may be only the charge amount of the battery by the charging and discharging device based on the second charging current. Optionally, the second cumulative charge amount may also be the current total charge amount of the battery, as an example, the current total charge amount of the battery=charge amount based on the first charging current+ charge amount based on the second charging current−discharge amount based on the first discharging current. Correspondingly, the second cumulative charge amount threshold may be a charge amount threshold based on a single charging, or the second cumulative charge amount threshold may also be a charge amount threshold based on a total charge amount.

Similar to the first cumulative charge amount and the first cumulative charge amount threshold described above, in the embodiments of the present application, the second cumulative charge amount may be a second cumulative charge capacity or may also be a second cumulative charge power amount. Correspondingly, if the second cumulative charge amount is the second accumulative charge capacity, the second cumulative charge amount threshold is the second accumulative charge capacity threshold, if the second cumulative charge amount is the second accumulative charge power amount, the second cumulative charge amount threshold is the second accumulative charge power amount threshold.

Optionally, in some embodiments, the above second cumulative charge amount threshold may be a preset threshold, the preset threshold may be a fixed threshold, or may vary over time in a preset manner.

In some other embodiments, the second cumulative charge amount threshold can also be determined according to the state parameter of the battery, that is, when the state parameter of the battery changes, the second cumulative charge amount threshold also changes accordingly.

Further, in step 310, the BMS acquires the second discharging current when the second cumulative charge amount is greater than or equal to the second cumulative charge amount threshold, and the voltage of the battery cell of the battery does not exceed the full charge voltage of the battery cell. And in steps 320 to 330, the BMS sends the second discharging current to the charging and discharging device, and the charging and discharging device controls the battery to be discharged based on the received second discharging current.

Specifically, other related technical solutions in the above steps can be referred to the related descriptions of steps 240 to 260 above, and will not be repeated here.

Figure 4:
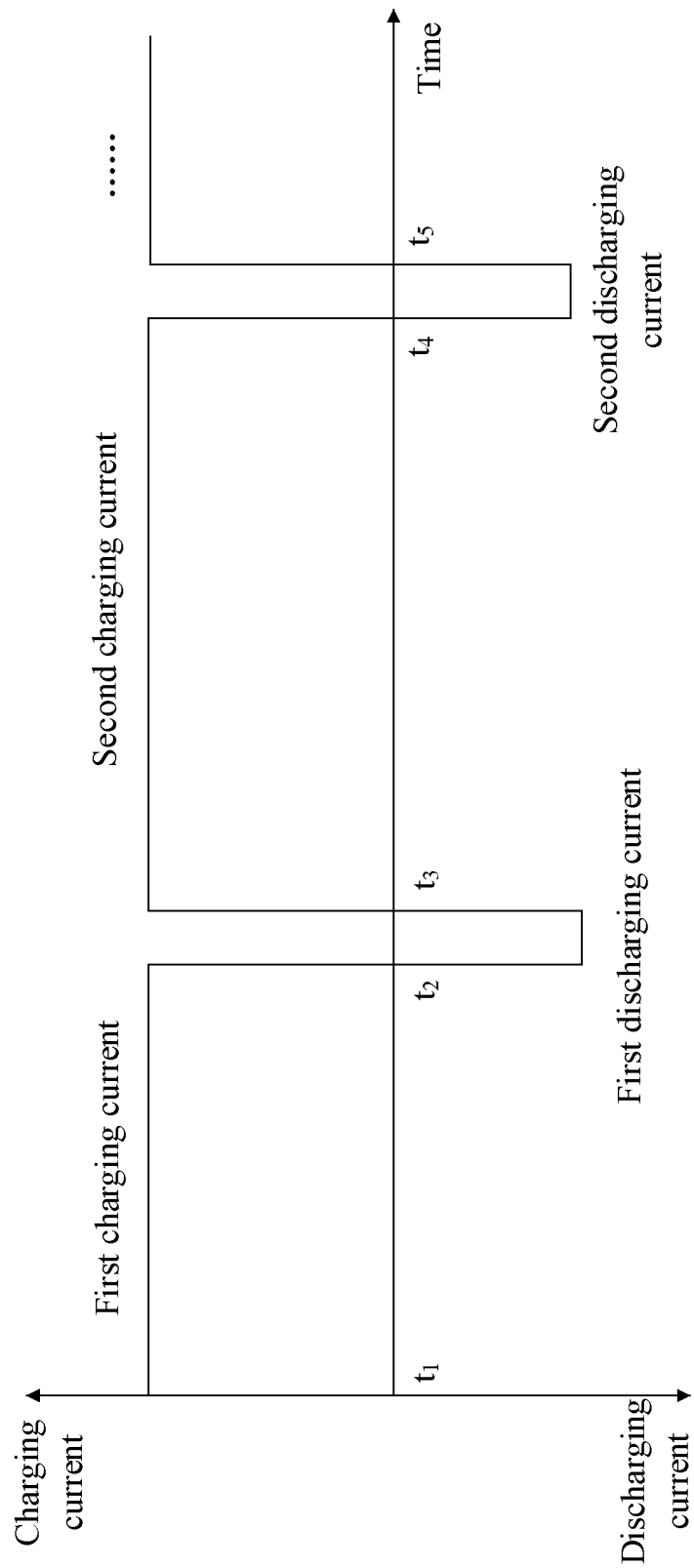
FIG. 4 is a schematic waveform diagram of a charging current and a discharging current of a battery provided by embodiments of the present application.

As an example, FIG. 4 shows a schematic waveform diagram of a charging current and a discharging current of a battery provided by an embodiment of the present application.

As shown in FIG. 4, in a time period from t1 to t2, the charging and discharging device charges the battery based on the first charging current, the charging continues until the first cumulative charge amount of the battery is greater than or equal to the first cumulative charge amount threshold, and the voltage of the battery cell of the battery does not exceed the full charge voltage of the battery cell. In the time period from t2 to t3, the charging and discharging device controls the battery to be discharged based on the first discharging current, the discharging continues until the first cumulative discharge amount of the battery is greater than or equal to the first cumulative discharge amount threshold, and Optionally, a duration of the first discharging current may be less than a duration of the first charging current. In the time period from t3 to t4, the charging and discharging device continuously charges the battery based on the second charging current, the charging continues until the second cumulative charge amount of the battery is greater than or equal to the second cumulative charge amount threshold and the voltage of the battery cell of the battery does not exceed the full charge voltage of the battery cell. In the time period from t4 to t5, the charging and discharging device controls the battery to be discharged based on the second discharging current, the discharging continues until the second cumulative discharge amount of the battery is greater than or equal to the second cumulative discharge amount threshold, and optionally, a duration of the second charging current may be less than the duration of the first charging current. It can be understood that the charging and discharging process continues until the battery is fully charged.

It should be noted that, waveform diagrams of the first charging current, the second charging current, the first discharging current and the second discharging current are only schematically shown in FIG. 4, the first charging current in the time period from t1 to t2 may be a constant current as shown in FIG. 4, or may also be a time varying current, and similarly, the second charging current, the first discharging current and the second discharging current may be constant currents as shown in FIG. 4, or may also be time varying currents. In addition, the magnitudes of the first charging current and the second charging current schematically shown in FIG. 4 are the same, and the magnitudes of the first discharging current and the second discharging current are also the same. In addition, the magnitudes of the first charging current and the second charging current may also be different, and the magnitudes of the first discharging current and the second discharging current may be different as well, which is not specifically limited by the embodiments of the present application.

Figure 5:
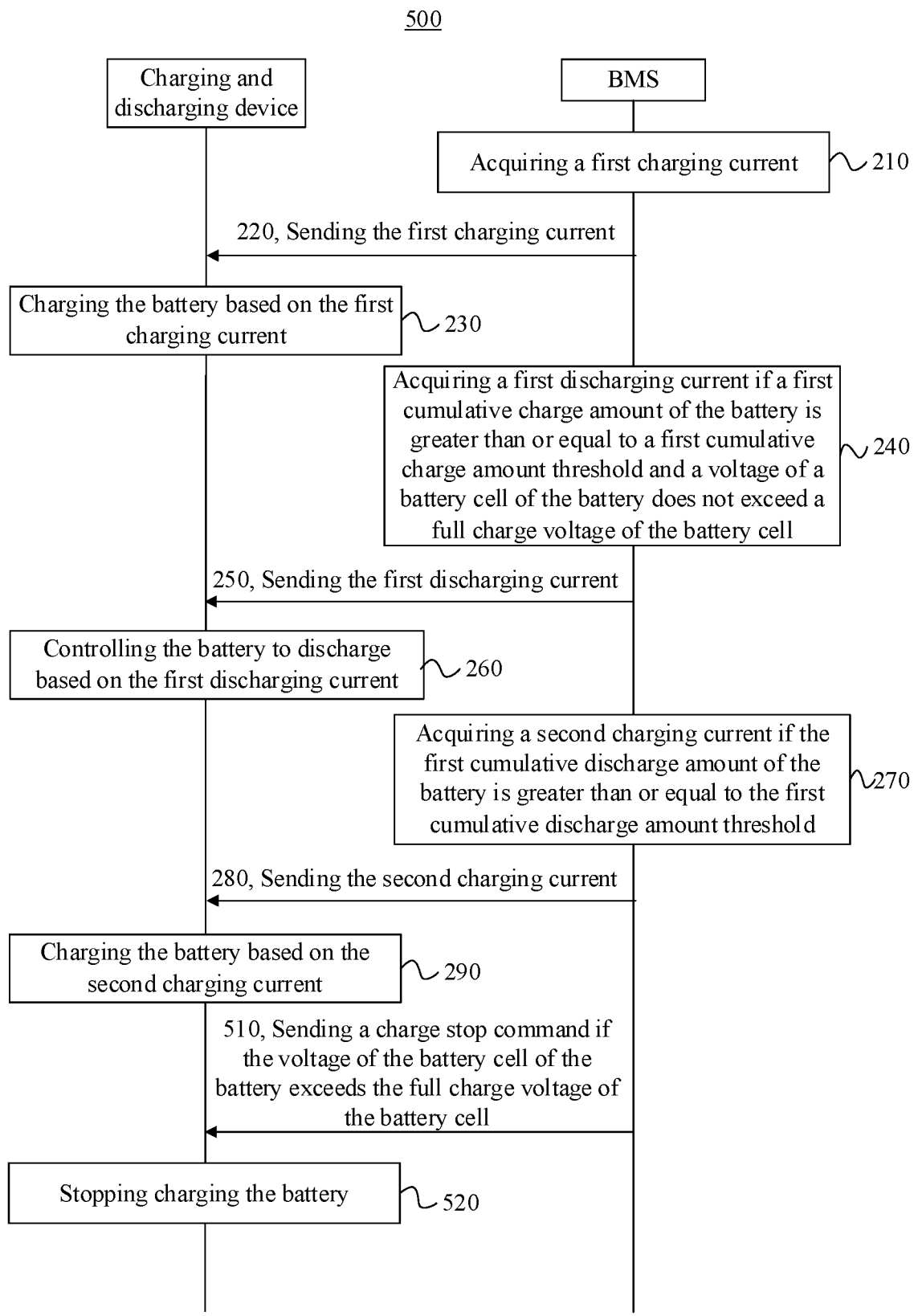
FIG. 5 is a schematic flow block diagram of another battery charging method provided by embodiments of the present application.

FIG. 5 is a schematic flow block diagram of another battery charging method 500 of the embodiments of the present application.

As shown in FIG. 5, the battery charging method 500 may further include the following steps in addition to steps 210 to 290 described above.

Step 510: if the voltage of the battery cell of the battery exceeds the full charge voltage of the battery cell, the BMS sends a charge stop command to the charging and discharging device.

Step 520: the charging and discharging device stops charging the battery.

Specifically, as described above, the BMS may monitor whether the battery reaches the fully charge state by monitoring the voltages of one or more battery cells in the battery. Optionally, in some embodiments, it may be determined whether the battery reaches a full charge state by determining whether the maximum voltage of the battery cell exceeds the full charge voltage of the battery cell. When the maximum voltage of the battery cell exceeds the full charge voltage of the battery cell, it indicates that the battery reaches the full charge state, and the BMS sends the charge stop command to the charging and discharging device at this time, and the charge stop command is used to instruct the charging and discharging device to stop charging the battery, so that the charging and discharging device stops charging the battery.

Optionally, steps 510 and 520 may be performed during the charging phase of the battery. In other words, when the BMS enters the charging mode, and after the charging and discharging device receives the charging current sent by BMS, in the process of charging the battery, the BMS can acquire the voltage of the battery cell to judge whether the battery reaches the full charge state. Once the voltage of the battery cell exceeds the full charge voltage of the battery cell, the BMS sends the charge stop command to the charging and discharging device to make the charging and discharging device stop charging the battery.

Thus, FIG. 5 only schematically shows that step 510 and step 520 are executed after step 290, i.e., executed in a process of the second charging, and it will be understood that step 510 and step 520 may also be executed during any one charging process of multiple charging and discharging processes.

Optionally, in the method embodiments described above, since the charging and discharging device is used for charging, discharging and recharging the battery, the safety problem caused by continuous charging to the battery can be prevented. Further, the charging current in the method can be a large current, so as to improve the charge amount of the battery in the single charging process and realize the purpose of rapid charging.

In addition, limited by the accumulation of lithium ions at the negative electrode during continuous charging, the charging current is also limited, therefore, it is impossible to use continuous large current to realize rapid charging of the battery, according to the technical solution of the embodiment of the present application, the battery is charged by using a large current, and the battery is discharged after a large current charging, so as to release lithium ions accumulated in the negative electrode of the battery during the charging process, and then the battery can be recharged by using a large current to realize rapid charging of the battery.

Specifically, in the above method, the first charging current and/or the second charging current may be large currents, and after the charging and discharging device charges the battery based on the second charging current, the charging current of the subsequent charging process may also be a large current.

Optionally, in order to realize large current fast charging, the charging rate of the first charging current and/or the second charging current ranges from 2C to 10C.

Furthermore, the discharging current in the embodiments of the present application is a small current, aiming at releasing lithium ions gathered in the negative electrode of the battery through the discharge of the battery with the small current, without causing excessive loss of amount of charge which has entered the battery.

Specifically, in the above method, the first discharging current and/or the second discharging current may be small currents, and after the charging and discharging device controls the battery to be discharged based on the second discharging current, the discharging current of the subsequent discharging process may also be a small current.

Optionally, in order to realize discharging at a small current, the charging rate of the first discharging current and/or the second discharging current ranges from 0.1C to 1C.

Optionally, in the above method, in order to better control the charge amount of the battery in the charging process and the discharge amount of the battery in the discharging process, a ratio of the cumulative discharge amount threshold in the discharging process and the cumulative charge amount threshold in the charging process can be set so that the discharge amount is relatively small without causing excessive loss of the amount of charge which has entered the battery.

As an example, in the above method, a ratio of the first cumulative discharge amount threshold to the first cumulative charge amount threshold is less than or equal to 10%, and/or a ratio of the second cumulative discharge amount threshold to the second cumulative charge amount threshold is less than or equal to 10%.

In addition, after the charging and discharging device charges the battery and controls the battery to be discharged based on the second charging current and the second discharging current, the ratio of the cumulative discharge amount threshold to the cumulative charge amount threshold in the subsequent charging and discharging process may also be less than or equal to 10%.

It should be noted that the above ratio of 10% can also be adjusted with the change of application scenarios and application requirements, and the specific value of this ratio is not limited in the present application.

Optionally, in the method embodiments described above, the first charging current and the second charging current acquired by the BMS may be the same or different. The first charging current and/or the second charging current may be a preset current. Optionally, the first charging current and/or the second charging current may also be currents determined according to the state parameter of the battery. When the state parameter of the battery changes, the first charging current and/or the second charging current may be different currents corresponding to different state parameters. The state parameter of the battery includes at least one of the following parameters: battery temperature, battery voltage, battery current, battery state of charge (SOC), battery state of health (SOH) and the like.

Similarly, the first and second discharging currents acquired by the BMS may be the same or different. The first discharging current and/or the second discharging current may be a preset current, or the first discharging current and/or the second discharging current may also be a current determined according to the state parameter of the battery.

If at least one of the first charging current, the second charging current, the first discharging current and the second discharging current is a current determined according to the state parameter of the battery, it can better adapt to the current state parameter of the battery, improve the charging efficiency and/or discharging efficiency of the battery, and will not cause damage to the battery.

In addition, after the charging and discharging device charges the battery based on the second charging current and the second discharging current and controls the battery to be discharged, the charging current and/or the discharging current in the subsequent charging and discharging process may also be preset currents, or may be currents determined according to the state parameters of the battery.

Figure 6:
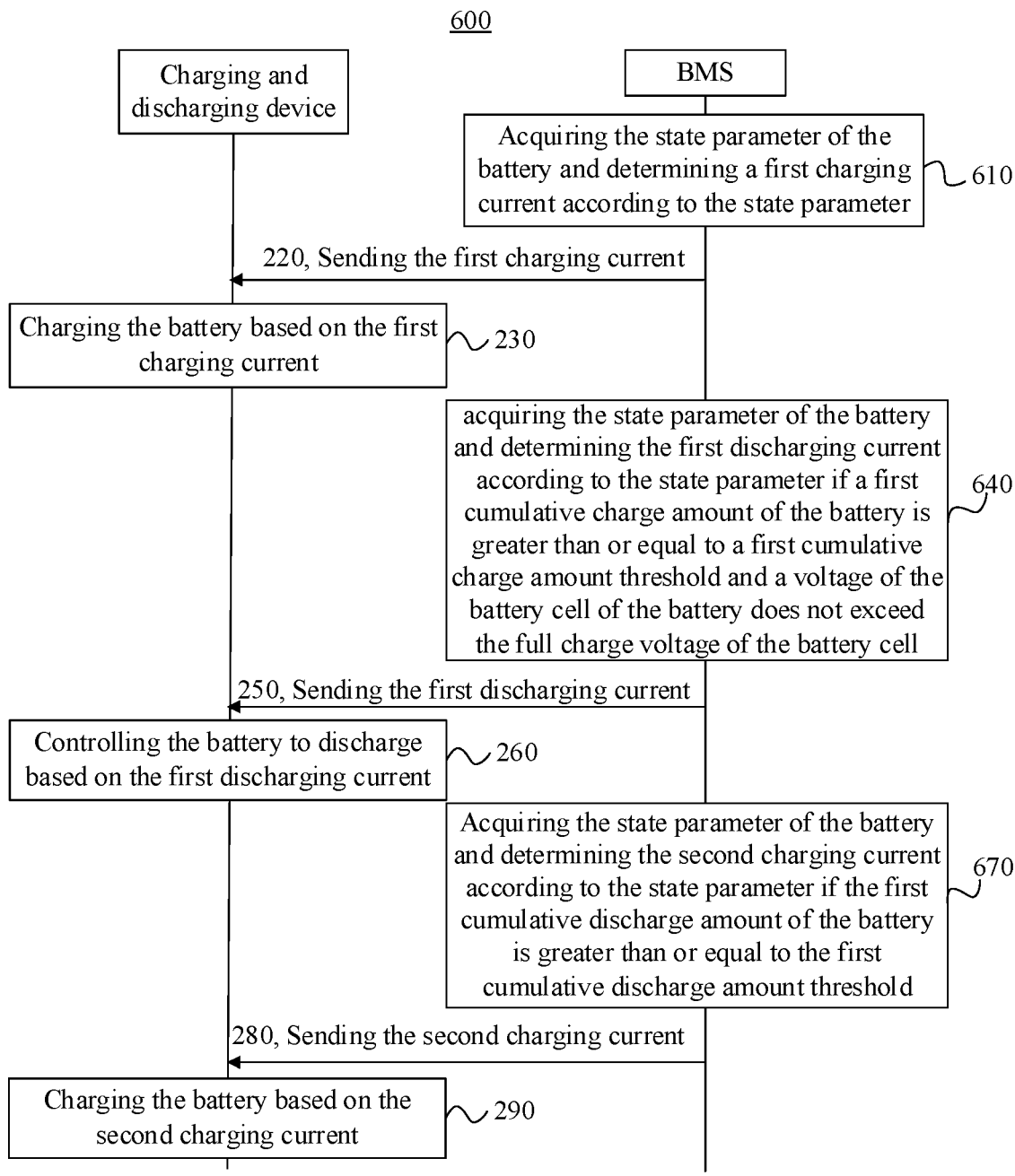
FIG. 6 is a schematic flow block diagram of another battery charging method provided by embodiments of the present application.

FIG. 6 is a schematic flow block diagram of another battery charging method 600 of the embodiments of the present application.

Based on the method 200 shown above in FIG. 2, as shown in FIG. 6, step 210 above may include:

step 610: the BMS acquiring the state parameter of the battery and determines a first charging current according to the state parameter.

Step 240 above may include:

step 640: if a first cumulative charge amount of the battery is greater than or equal to a first cumulative charge amount threshold and a voltage of the battery cell of the battery does not exceed the full charge voltage of the battery cell, the BMS acquiring the state parameter of the battery and determines the first discharging current according to the state parameter.

Step 270 above may include:

step 670: if the first cumulative discharge amount of the battery is greater than or equal to the first cumulative discharge amount threshold, the BMS acquiring the state parameter of the battery and determines the second charging current according to the state parameter.

In addition, other steps of method 600 in the embodiments of the present application may be referred to above in relation to the description of the embodiments shown in FIG. 2 and will not be repeated here.

Specifically, in the embodiments of the present application, the first charging current, the first discharging current and the second charging current are all currents determined according to the state parameters of the battery. BMS can obtain different state parameters of the battery in different time periods, and determine the current charging current and discharging current according to the state parameters.

Optionally, determining the charging current and the discharging current according to the state parameters of the battery can be realized in a plurality of ways. As an example, the mapping relationships between the state parameters of the battery and each of the charging current and the discharging current can be acquired, according to the mapping relationships, the specific charging current and discharging current are determined by the state parameters of the battery, wherein the mapping relationships can be obtained by fitting a large number of experimental data, which has high reliability and accuracy, and the mapping relationship can be a mapping table, a mapping diagram or a mapping formula, etc. In addition, in other examples, a special neural network model can be trained according to a large number of experimental data, and the neural network model can output charging current and discharging current according to the input state parameters of the battery.

Optionally, in addition to the charging current and the discharging current, the first cumulative charge amount threshold and the second cumulative charge amount threshold may be the same or different in the above method embodiments. The first cumulative discharge amount threshold and the second cumulative discharge amount threshold may be the same or different. At least one of the first cumulative charge amount threshold, the second cumulative charge amount threshold, the first cumulative discharge amount threshold and the second cumulative discharge amount threshold may be a preset threshold. Optionally, at least one of the first cumulative charge amount threshold, the second cumulative charge amount threshold, the first cumulative discharge amount threshold and the second cumulative discharge amount threshold may be a threshold determined according to the state parameter of the battery.

In addition, after the charging and discharging device charges the battery based on the second charging current and the second discharging current and controls the battery to be discharged, the cumulative discharge amount threshold and the cumulative charge amount threshold in the subsequent charging and discharging process may be preset thresholds or may be thresholds determined according to the state parameters of the battery.

With the embodiments of the present application, if at least one of the first cumulative charge amount threshold, the second cumulative charge amount threshold, the first cumulative discharge amount threshold and the second cumulative discharge amount threshold is a threshold determined according to the state parameter of the battery, it can better adapt to the current state parameters of the battery, so as to better control the current charging process and/or discharging process, ensure the charge amount and discharge amount, and realize the efficient charging of the battery.

Optionally, in the method embodiments described above, at least one of the first charging current, the second charging current, the first discharging current and the second discharging current may be a current periodically or aperiodically acquired by the BMS, As an example, At least one of the first charging current, the second charging current, the first discharging current and the second discharging current may be a current periodically or aperiodically determined by the BMS based on a state parameter of the battery, The current varies with a change in a state parameter of the battery, in particular, the BMS may periodically acquire the state parameter of the battery to determine at least one of a first charging current, a second charging current, a first discharging current, and a second discharging current: Optionally, the BMS acquires a state parameter of the battery in real time, and when the state parameter varies aperiodically, the BMS determines at least one of the first charging current, the second charging current, the first discharging current, and the second discharging current according to the aperiodically changed state parameter.

Further, on this basis, the BMS periodically or aperiodically sends at least one of the first charging current, the second charging current, the first discharging current, and the second discharging current to the charging and discharging device, such that the charging and discharging device charges the battery or controls the battery to be discharged based on the periodically or aperiodically sent current.

In this implementation, in the process of single charging and/or single discharging of the battery by the charging and discharging device, the charging current and/or discharging current are sent periodically or aperiodically by the BMS, on the one hand, the charging current and/or discharging current can be periodically or aperiodically adjusted by the embodiment to improve the charging and discharging efficiency: on the other hand, the charging current and/or discharging current sent periodically or aperiodically can indicate that the state of the BMS and the battery is normal, and the charging and discharging device can continue to charge the battery or control the battery to be discharged. Therefore, in this embodiment, if the charging and discharging device does not receive the charging current and/or discharging current sent periodically or aperiodically by the BMS, the charging and discharging device can stop charging the battery and/or stop controlling the battery to be discharged, so as to ensure the safety performance of the battery.

Figure 7:
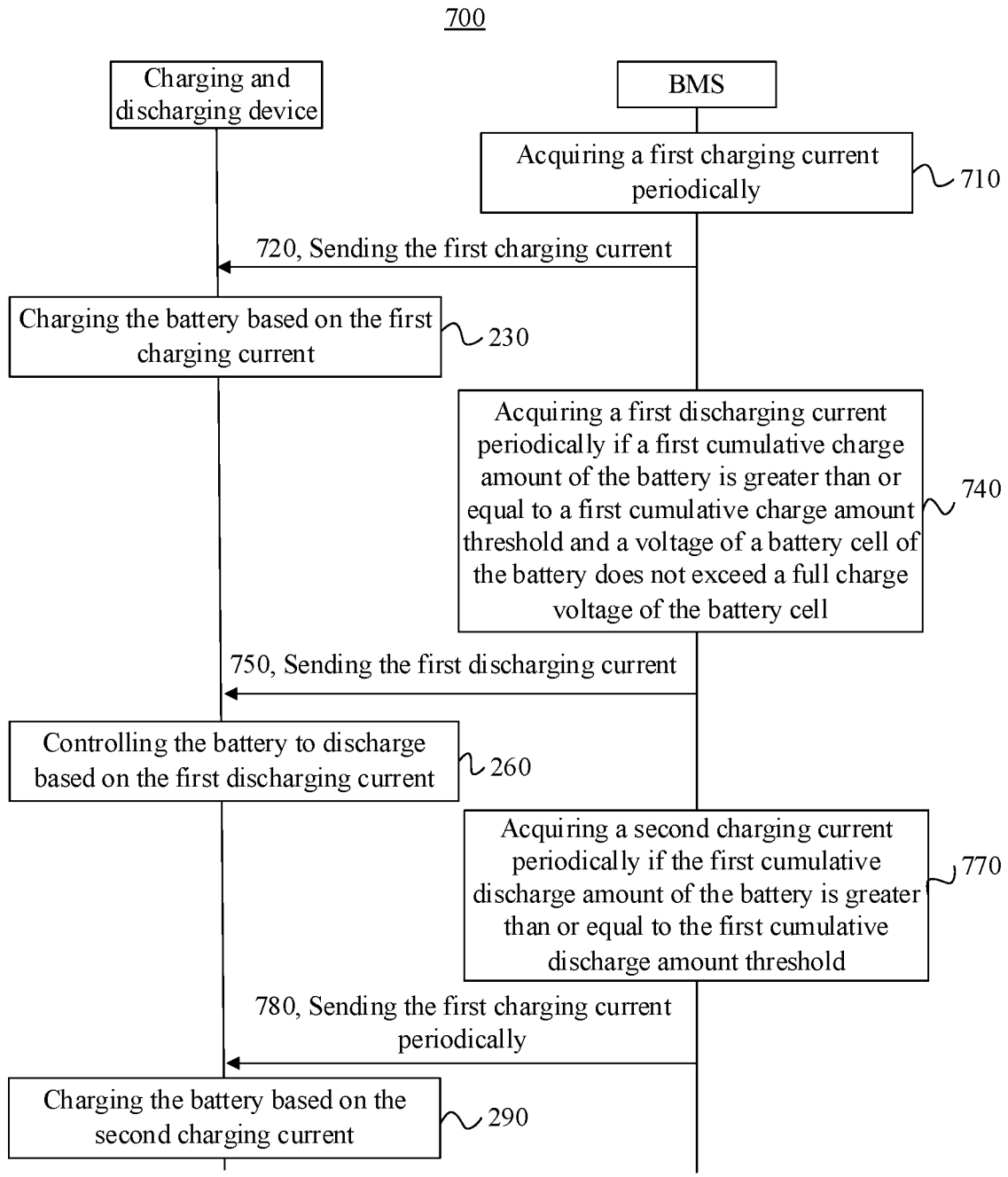
FIG. 7 is a schematic flow block diagram of another battery charging method provided by embodiments of the present application.

FIG. 7 is a schematic flow block diagram of another battery charging method 700 of the embodiments of the present application.

Based on the method 200 shown above in FIG. 2, as shown in FIG. 7, step 210 above may include:

Step 710: the BMS acquiring the first charging current.

Step 220 above may include:

step 720: the BMS sending the first charging current to the charging and discharging device.

Step 240 above may include:

step 740: if the first cumulative charge amount of the battery is greater than or equal to the first cumulative charge amount threshold and the voltage of the battery cell of the battery does not exceed the full charge voltage of the battery cell, periodically acquiring the first discharging current.

Step 250 above may include:

step 750: the BMS sending the first discharging current to the charging and discharging device.

Step 270 above may include:

step 770: if the first cumulative discharge amount of the battery is greater than or equal to the first cumulative discharge amount threshold, periodically acquiring a second charging current.

Step 280 above may include:

step 780: the BMS periodically sending the first charging current to the charging and discharging device.

In addition, other steps of method 700 in the embodiments of the present application may be referred to above in relation to the description of the embodiments shown in FIG. 2 and will not be repeated here.

In the embodiments of the present application, the BMS can periodically acquire the first charging current, the first discharging current, and the second charging current. Correspondingly, the BMS can periodically send the first charging current, the first discharging current and the second charging current to the charging and discharging device.

It can be understood that in the above embodiments, in addition to the current information required for charging and discharging, voltage information required for charging and discharging is also required for charging and discharging the battery, and the method of acquiring the voltage required for charging and discharging is not limited to the embodiments of the present application.

Optionally, in the embodiments of the method, the communication between the BMS and the charging and discharging device is compatible with the existing communication protocol between the charger and the BMS, so that the communication between the BMS and the charging and discharging device is easy to realize and has a good application prospect.

In particular, on the basis of the above method embodiments, the BMS may also acquire at least one of a first charging voltage, a second charging voltage, a first discharging voltage, and a second discharging voltage, and sending at least one of the first charging voltage, the second charging voltage, the first discharging voltage and the second discharging voltage to the charging and discharging device, wherein the first charging current and the first charging voltage are carried in the first battery charging lab (BCL) message, and/or the first discharging current and the first discharging voltage are carried in the second BCL message, and/or the second charging current and the second charging voltage are carried in the third BCL message, and/or the second discharging current and the second discharging voltage are carried in the fourth BCL message.

In addition, after the charging and discharging device charges the battery and controls the battery to be discharged based on the second charging current and the second discharging current, the charging current, charging voltage, discharging current and discharging voltage in the subsequent charging and discharging process can also be carried in the BCL message and sent to the charging and discharging device through BMS.

Figure 8:
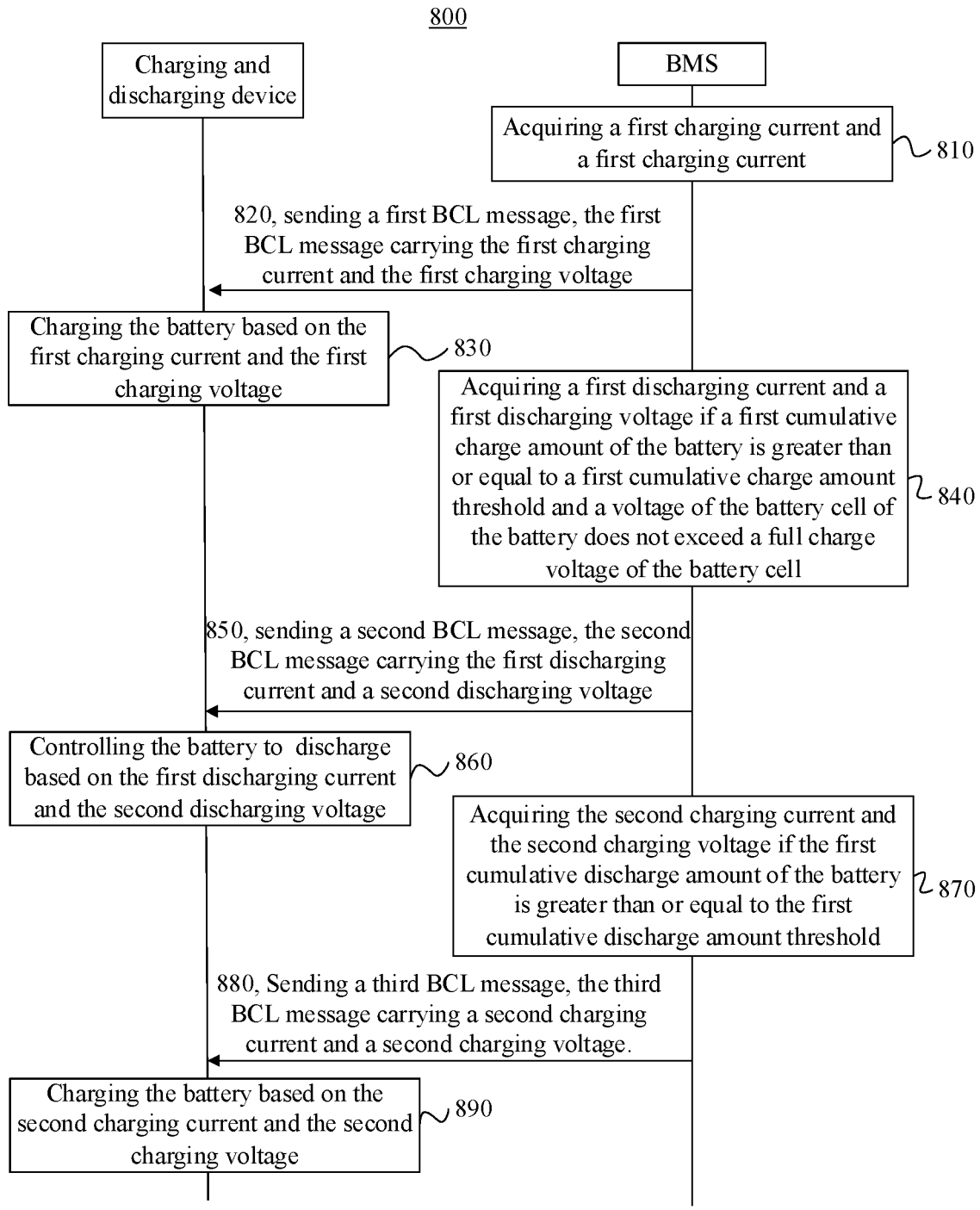
FIG. 8 is a schematic flow block diagram of another battery charging method provided by embodiments of the present application.

FIG. 8 is a schematic flow block diagram of another battery charging method 800 of the embodiments of the present application.

As shown in FIG. 8, the battery charging method 800 may include the following steps.

Step 810: the BMS acquires a first charging current.

Step 820: the BMS sends a first BCL message to the charging and discharging device, the first BCL message carrying a first charging current and a first charging voltage.

Step 830: the charging and discharging device charges the battery based on the first charging current and the first charging voltage.

Step 840: if a first cumulative charge amount of the battery is greater than or equal to a first cumulative charge amount threshold and a voltage of the battery cell of the battery does not exceed a full charge voltage of the battery cell, the BMS acquires a first discharging current and a first discharging voltage.

Step 850: the BMS sends a second BCL message to the charging and discharging device, the second BCL message carrying the first discharging current and a first discharging voltage.

Step 860: the charging and discharging device controls the battery to be discharged based on the first discharging current and the first discharging voltage.

Step 870: if the first cumulative discharge amount of the battery is greater than or equal to the first cumulative discharge amount threshold, the BMS acquires the second charging current and the second charging voltage.

Step 880: the BMS sends the third BCL message to the charging and discharging device, the third BCL message carrying the second charging current and the second charging voltage.

Step 890: the charging and discharging device charges the battery based on the second charging current and the second charging voltage.

In the embodiments of the present application, the BMS sends a charging current and a discharging current to a charging and discharging device using a BCL message in a communication protocol between the existing charger and the BMS, and the charging and discharging device charges or controls the battery to be discharged based on the received charging current and the discharging current.

Optionally, in the BCL message, the charging voltage (including the first charging voltage and the second charging voltage) and the discharging voltage (including the first discharging voltage and the second discharging voltage) have different ranges, and the charging current (including the first charging current and the second charging current) and the discharging current (including the first discharging current and the second discharging current) have different ranges. In the BCL message received by the charging and discharging device, it can be judged whether it belongs to charging voltage and charging current or discharging voltage and discharging current by the magnitude of the voltage and current carried in it.

Optionally, the BMS may determine the charging voltage and the discharging voltage according to the state parameter of the battery, or the charging voltage and the discharging voltage may be preset values.

Optionally, in some embodiments, the BMS may periodically acquire a charging current and a charging voltage and periodically send a BCL message carrying the charging current and the charging voltage to the charging and discharging device, and similarly, the BMS may periodically acquire a discharging current and a discharging voltage and periodically send a BCL message carrying the discharging current and the discharging voltage to the charging and discharging device. In the implementation, the periodic sending mode of the BCL message can be the same as the periodic sending mode of the BCL message in the prior art standard.

The above example is illustrated by the information interaction message of charging and discharging current and/or voltage, it can be understood that in order to realize the charging and discharging of the battery, besides the processing in the charging and discharging stage, it can also include the handshake interaction between the vehicle and the charger before charging and discharging, the parameter configuration interaction of charging and discharging, etc. The embodiments of the present application do not specifically limit this.

Optionally, communication protocols between the charger and the BMS include vehicle to grid (V2G) mode and grid to vehicle (G2V) mode.

Specific embodiments of the battery charging method provided by the present application have been described above with reference to FIGS. 2 to 8, and the specific embodiments of the related device provided by the present application will be described below with reference to FIGS. 9 to 12. It can be understood that the related description in the following device embodiments can refer to the foregoing embodiments and will not be repeated here for the sake of brevity.

Figure 9:
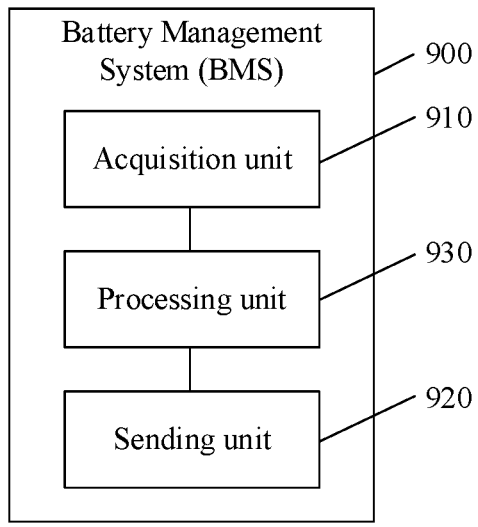
FIG. 9 is a schematic structural block diagram of a battery management system BMS provided by embodiments of the present application.

FIG. 9 shows a schematic structural block diagram of a battery management system BMS 900 according to one embodiment of the present application. As shown in FIG. 9, the BMS 900 includes an acquisition unit 910, a sending unit 920 and a processing unit 930.

In one embodiment of the present application, the acquisition unit 910 is used for acquiring a first charging current: the sending unit 920 is used for sending the first charging current to the charging and discharging device, so that the charging and discharging device charges the battery based on the first charging current: when the processing unit 930 is used for determining that a first cumulative charge amount of the battery is greater than or equal to a first cumulative charge amount threshold and a voltage of a battery cell of the battery does not exceed the full charge voltage of the battery cell, the acquisition unit 910 is also used for acquiring a first discharging current; the sending unit 920 is further used for sending the first discharging current to the charging and discharging device, so that the charging and discharging device controls the battery discharge based on the first discharging current. Optionally, when the processing unit 930 is further used for determining that when the first cumulative discharge amount of the battery is greater than or equal to the first cumulative discharge amount threshold, the acquisition unit 910 is further used for acquiring a second charging current: and the sending unit 920 is further used for sending the second charging current to the charging and discharging device, so that the charging and discharging device charges the battery based on the second charging current.

Optionally, when the processing unit 930 is further used for determining that a second cumulative charge amount of the battery is greater than or equal to a second cumulative charge amount threshold and a voltage of the battery cell of the battery does not exceed the full charge voltage of the battery cell, the acquisition unit 910 is further used for acquiring a second discharging current; and the sending unit 920 is further used for sending the second discharging current to the charging and discharging device, so that the charging and discharging device controls the battery to be discharged based on the second discharging current.

Optionally, the processing unit 930 is further used for determining that the voltage of the battery cell of the battery exceeds the full charge voltage of the battery cell, and the sending unit 920 is further used for sending a charge stop command to the charging and discharging device for instructing the charging and discharging device to stop charging the battery.

Optionally, the charging rate of the first charging current and/or the second charging current ranges from 2C to 10C.

Optionally, the discharging rate of the first discharging current and/or the second discharging current ranges from 0.1C to 1C.

Optionally, a ratio of the first cumulative discharge amount threshold to the first cumulative charge amount threshold is less than or equal to 10%, and/or a ratio of the second cumulative discharge amount threshold to the second cumulative charge amount threshold is less than or equal to 10%.

Optionally, the acquisition unit 910 is used for acquiring a state parameter of the battery and determining a first charging current according to the state parameter; and/or the acquisition unit 910 is used for acquiring a state parameter of the battery and determining a first discharging current according to the state parameter; and/or the acquisition unit 910 is used for acquiring a state parameter of the battery and determining a first discharging current according to the state parameter, wherein the state parameter of the battery includes at least one of a battery temperature, a battery voltage, a battery current, a battery state of charge, and a battery state of health.

Optionally, the acquisition unit 910 is used for periodically acquiring the first charging current, and the sending unit 920 is used for periodically sending the first charging current to the charging and discharging device; and/or, the acquisition unit 910 is used for periodically acquiring the first discharging current, and the sending unit 920 is used for periodically sending the first discharging current to the charging and discharging device; and/or, the acquisition unit 910 is used for periodically acquiring the second charging current, and the sending unit 920 is used for periodically sending the second charging current to the charging and discharging device.

Optionally, the acquisition unit 910 is further used for acquiring a first charging voltage, and the sending unit 920 is further used for send the first charging voltage to the charging and discharging device, wherein the first charging current and the first charging voltage are carried in the first BCL message; and/or, the acquisition unit 910 is further used for acquiring a first discharging voltage, and the sending unit 920 is further used for sending the first discharging voltage to the charging and discharging device, wherein the first discharging current and the first discharging voltage are carried in the second BCL message; and/or, the acquisition unit 910 is further used for acquiring a second charging voltage, the sending unit 920 is further used for sending the second charging voltage to the charging and discharging device, wherein the second charging current and the second charging voltage are carried in the third BCL message; and/or, the acquisition unit 910 is also used for acquiring the second discharging voltage, and the sending unit 920 is also used for sending the second discharging voltage to the charging and discharging device, wherein the second discharging current and the second discharging voltage are carried in the fourth BCL message.

Figure 10:
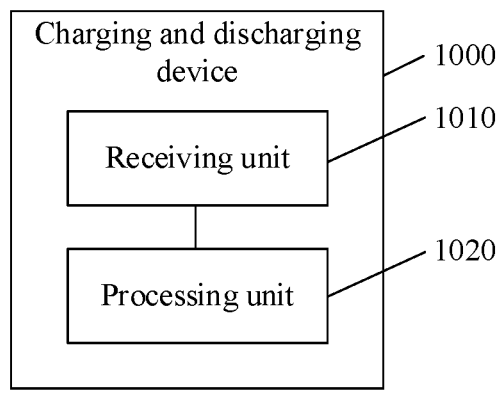
FIG. 10 is a schematic structural block diagram of a charging and discharging device provided by embodiments of the present application.

FIG. 10 shows a schematic structural block diagram of a charging and discharging device 1000 according to one embodiment of the present application. As shown in FIG. 10, the charging and discharging apparatus 1000 includes a receiving unit 1010 and a processing unit 1020.

In one embodiment of the present application, the receiving unit 1010 is used for receiving a first charging current sent by the battery management system BMS; the processing unit 1020 is used for charging the battery based on the first charging current; the receiving unit 1010 is further used for receiving a first discharging current sent by the BMS, the processing unit 1020 is further used for controlling battery discharge based on a first discharging current, wherein the first discharging current is a discharging current sent by the BMS when the first cumulative charge amount of the battery is greater than or equal to the first cumulative charge amount threshold and the voltage of the battery cell of the battery does not exceed the full charge voltage of the battery cell; the receiving unit 1010 is further used for receiving a second charging current sent by the BMS, and the processing unit 1020 is further used for charging the battery based on the second charging current, wherein the second charging current is the charging current sent by the BMS when the first cumulative discharge amount of the battery is greater than or equal to the first cumulative discharge amount threshold.

Optionally, the receiving unit 1010 is further used for receiving a second discharging current sent by the BMS, the processing unit 1020 is further used for controlling battery to be discharged based on a second discharging current, wherein the second discharging current is a discharging current sent by the BMS when the second cumulative charge amount of the battery is greater than or equal to the second cumulative charge amount threshold and the voltage of the battery cells of the battery does not exceed the full charge voltage of the battery cells.

Optionally, the receiving unit 1010 is further used for receiving a charge stop command sent by the BMS, and the processing unit 1020 is used for stopping charging the battery, wherein the charge stop command is a command sent by the BMS when the voltage of the battery cell of the battery exceeds the full charge voltage of the battery cell.

Optionally, the charging rate of the first charging current and/or the second charging current ranges from 2C to 10C.

Optionally, the discharging rate of the first discharging current and/or the second discharging current ranges from 0.1C to 1C.

Optionally, a ratio of the first cumulative discharge amount threshold to the first cumulative charge amount threshold is less than or equal to 10%, and/or a ratio of the second cumulative discharge amount threshold to the second cumulative charge amount threshold is less than or equal to 10%.

Optionally, at least one of the first charging current, the first discharging current, and the second charging current is determined by the BMS according to the state parameter of the battery, wherein the state parameter of the battery includes at least one of a battery temperature, a battery voltage, a battery current, a battery state of charge, and a battery state of health.

Optionally, the receiving unit 1010 is used for periodically receiving the first charging current sent by the BMS: and/or, the receiving unit 1010 is configured to periodically receive the first discharging current sent by the BMS: and/or, the receiving unit 1010 is used for periodically receiving the second charging current sent by the BMS.

Optionally, the receiving unit 1010 is further used for receiving a first charging voltage sent by the BMS, wherein the first charging voltage and the first charging current are carried in the first BCL message: and/or, the receiving unit 1010 is further used for receiving a first discharging voltage sent by the BMS, wherein the first discharging voltage and the first discharging current are carried in the second BCL message; and/or, the receiving unit 1010 is further used for receiving a second charging voltage sent by the BMS, wherein the second charging voltage and the second charging current are carried in the third BCL message; and/or, the receiving unit 1010 is further used for receiving a second discharging voltage sent by the BMS, wherein the second discharging voltage and the second discharging current are carried in the fourth BCL message.

Embodiments of a method and device for charging a battery based on information interaction between the charging and discharging device and the BMS provided by the present application are described above in connection with FIGS. 2 to 10, for which charging and controlling the discharge of the battery can be realized through different hardware architectures.

Figure 11:
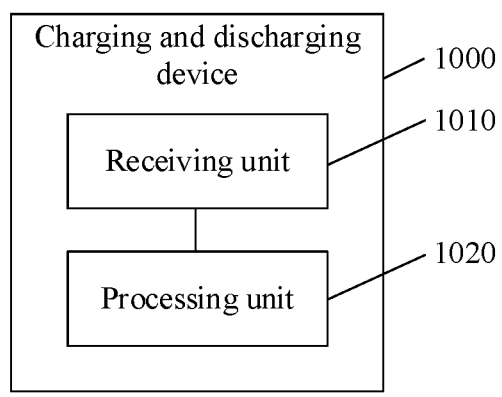
FIG. 11 is a schematic structural block diagram of another charging and discharging device provided by embodiments of the present application.

FIG. 11 shows a schematic structural block diagram of another charging and discharging device provided by the embodiments of the present application.

As shown in FIG. 11, the charging and discharging device 1100 may include a control unit 1110 and a power conversion unit 1120.

In one embodiment, the control unit 1110 is used for receiving a first charging current sent by the BMS and control the power conversion unit 1120 to charge the battery based on the first charging current; the control unit 1110 is further used for receiving a first discharging current sent by the BMS, and controlling the power conversion unit 1120 to discharge the battery based on a first discharging current, wherein the first discharging current is a discharging current sent by the BMS when the first cumulative charge amount of the battery is greater than or equal to the first cumulative charge amount threshold and the voltage of the battery cells of the battery does not exceed the full charge voltage of the battery cells. The control unit 1110 is further used for receiving a second charging current sent by the BMS and controlling the power conversion unit 1120 to charge the battery based on the second charging current, wherein the second charging current is the charging current sent by the BMS when the first cumulative discharge amount of the battery is greater than or equal to the first cumulative discharge amount threshold.

Specifically, the power conversion unit 1120 may include a high-voltage device for realizing power conversion of a high power, while the control unit 1110 may include a low-voltage circuit for realizing a control function of the high-voltage device in the power conversion unit 1120. In addition, the control unit 1110 may also establish a communication connection with the BMS, for example, by way of example but not limitation, the control unit 1110 may establish a communication connection with the BMS through a communication bus, or the control unit 1110 may also establish a communication connection with the BMS through a wireless network.

Figure 12:
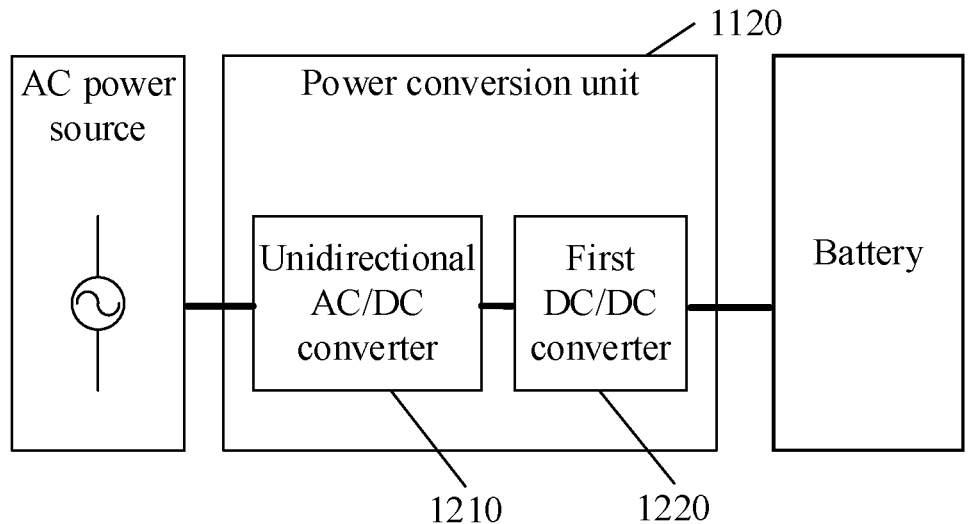
FIG. 12 is a schematic structural block diagram of a power conversion unit in the charging and discharging device provided by embodiments of the present application.

Optionally, as an example, FIG. 12 shows a schematic structural block diagram of the power conversion unit 1120 provided by the embodiments of the present application.

As shown in FIG. 12, the power conversion unit 1120 may be connected to an alternating current (AC) power source and a battery, where the power conversion unit 1120 includes a unidirectional alternating current/direct current (AC/DC) converter 1210 and a first direct current/direct current (DC/DC) converter 1220. The first DC/DC converter 1220 is a unidirectional DC/DC converter.

As can be seen from FIG. 12, a first end of the unidirectional AC/DC converter 1210 may be connected to an AC power source, a second end of the unidirectional AC/DC converter 1210 may be connected to a first end of the first DC/DC converter 1220, and a second end of the first DC/DC converter 1220 may be connected to a battery to achieve current transfer between the battery and the AC power source.

In this case, the BMS may send a first charging current to the control unit 1110, and accordingly, the control unit 1110 may be used for receiving the first charging current sent by the BMS and control the unidirectional AC/DC converter 1210 and the first DC/DC converter 1220 based on the first charging current to charge the battery through by the AC power source.

Also, when the first cumulative charge amount of the battery is greater than or equal to the first cumulative charge amount threshold and the voltage of the battery cell of the battery does not exceed the full charge voltage of the battery cell, the BMS may send a first discharging current to the control unit 1110, which may be used for receiving the first discharging current and controlling the battery to release power based on the first discharging current.

In the process of charging the battery, the charging and discharging device can realize charging and discharging the battery based on the first charging current and the first discharging current sent by the BMS, thereby avoiding continuous charging of the battery, thereby avoiding problems such as heating and lithium ion accumulation caused by continuous charging of the battery. As heating will cause the temperature of the battery to rise, crystals produced by lithium ion accumulation may puncture the battery, causing electrolyte leakage and short circuit of the battery. The temperature rise and short circuit of the battery may cause safety problems of the battery, such as burning or explosion of the battery. Therefore, the charging and discharging device realizes the charging and discharging of the battery based on the first charging current and the first discharging current sent by the BMS, which can ensure the safety performance of the battery. In addition, in the process of continuous charging, the continuous aggregation of lithium ions will also cause lithium precipitation problems, which will affect the service life and charge capacity of the battery. Therefore, charging and discharging device can also ensure the service life and charge capacity of the battery.

Further, the charging and discharging device includes a unidirectional AC/DC converter and a unidirectional DC/DC converter, namely, the structure of the charging and discharging device of the embodiments of the application is the same as that of the existing charging pile, that is to say, the charging and discharging of the battery can be realized without changing the prior charging pile structure, and the charging cost is greatly reduced.

When the first cumulative discharge amount of the battery is greater than or equal to the first cumulative discharge amount threshold, optionally, the control unit 1110 may also be used for receiving the second charging current sent by the BMS and control the unidirectional AC/DC converter 1210 and the first DC/DC converter 1220 to charge the battery through the AC power source based on the second charging current.

When the control unit 1110 controls the unidirectional AC/DC converter 1210 and the first DC/DC converter 1220 to charge a battery through the AC power source, the control unit 1110 may sequentially control the unidirectional AC/DC converter 1210 and the first DC/DC converter 1220.

In addition to the first charging current, the first discharging current and the second charging current, when the second cumulative charge amount of the battery is greater than or equal to the second cumulative charge amount threshold and the voltage of the battery cell of the battery does not exceed the full charge voltage, the BMS may also send a second discharging current to the control unit 1110, and accordingly, the control unit 1110 may also be used for receiving the second discharging current sent by the BMS and controlling the battery release power based on the second discharging current.

When the voltage of the battery cell of the battery exceeds the full charge voltage during the cycle of charging and discharging the battery, the BMS may send a charge stop command to the control unit 1110, which is used for instructing the charging and discharging device to stop charging the battery. Accordingly, the control unit 1110 is used for receiving a charge stop command sent by the BMS, and based on the charge stop command, controlling the unidirectional AC/DC converter 1210 and the first DC/DC converter 1220 so that the AC power source stops charging the battery.

In the technical solution, when the voltage of the battery cell exceeds the full charge voltage, the control unit controls the AC/DC converter and the first DC/DC converter by receiving the charge stop command to make the AC power source stop charging the battery, thus preventing the battery from overcharging and further ensuring the safety performance of the battery.

Figure 13:
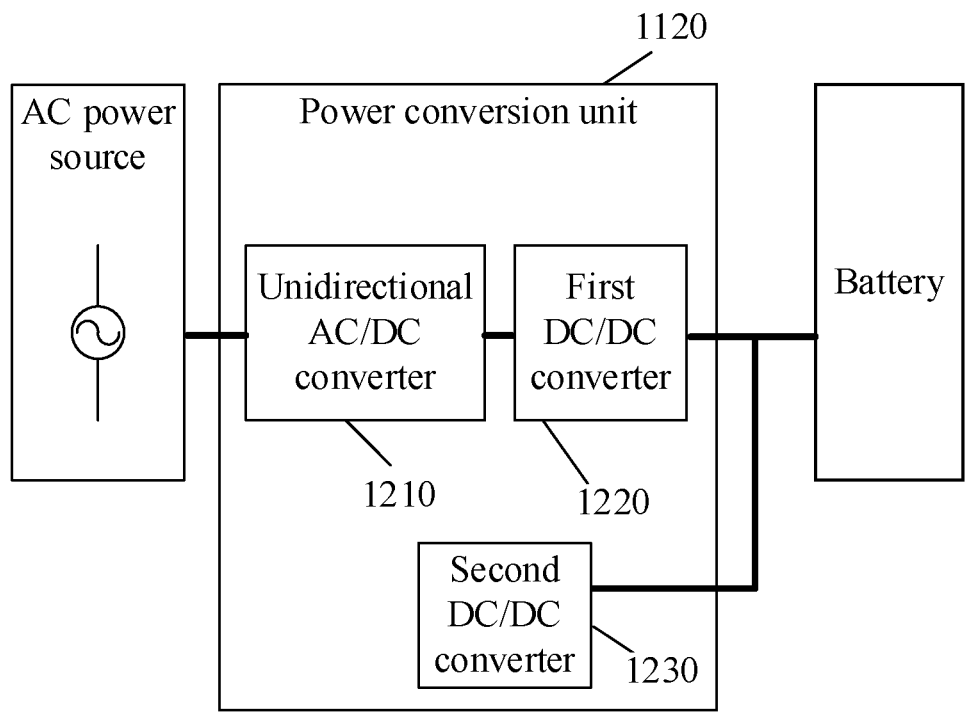
FIG. 13 is a schematic structural block diagram of another power conversion unit provided by embodiments of the present application.

Optionally, as shown in FIG. 13, the power conversion unit 1120 may also include a second DC/DC converter 1230. Specifically, the second end of the second DC/DC converter 1230 may be connected to the battery and the second end of the first DC/DC converter 1220, respectively.

Based on this, the control unit 1100 may specifically be used for controlling the second DC/DC converter 1230 to release the power of the battery into the energy storage unit based on the first discharging current. In the above technical solution, the power of the battery is released into the energy storage unit, so that the energy storage unit can perform other operations based on the received power, thus avoiding the waste of power.

Optionally, the energy storage unit may be a low-power energy storage unit. For example, the energy storage unit may be a super battery or a lithium carbonate battery. By setting the energy storage unit as a low-power energy storage unit, the cost of the charging system can be reduced.

Optionally, the energy storage unit may be provided independently of the charging and discharging device 1110, or the charging and discharging device 1110 may also include the energy storage unit. When the charging and discharging device includes an energy storage unit, as shown in FIG. 14, the energy storage unit may be a part of the power conversion unit 1120, or may be a unit independent of the power conversion unit 1120 and connected to the power conversion unit 1120 through a wire, which is not specifically limited in the embodiments of the present application.

For convenience of description, a solution of the embodiments of the present application is described below taking the energy storage unit 1240 as a part of the power conversion unit 1120 as an example.

Figure 14:
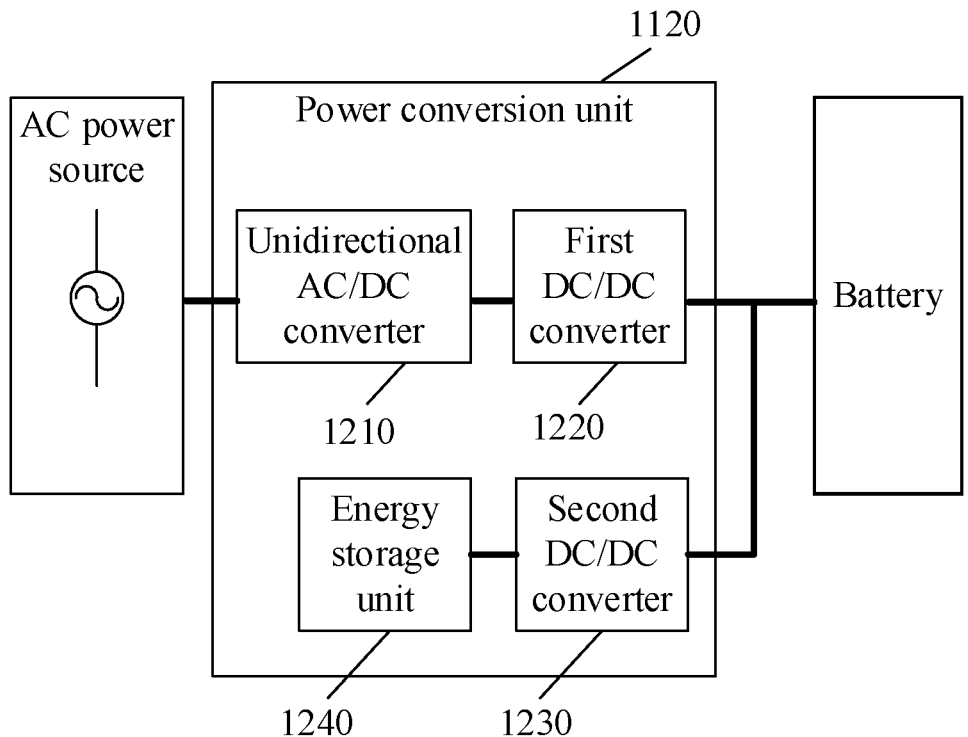
FIG. 14 is a schematic structural diagram of yet another power conversion unit provided by embodiments of the present application.

As can be seen from FIG. 14, in the power conversion unit 1120, a first end of the unidirectional AC/DC converter 1210 is connected to an AC power source, a second end is connected to a first end of the first DC/DC converter 1220, the second end of the first DC/DC converter 1220 is respectively connected to a battery and a second end of the second DC/DC converter 1230, and the first end of the second DC/DC converter 1230 is connected to an energy storage unit 1240.

Further, before discharging the battery, the control unit 1110 may control the unidirectional AC/DC converter 1210 and the first DC/DC converter 1220 to turn off the mode of charging the battery, and control the second DC/DC converter 1230 to turn on the mode of discharging the energy storage unit 1240.

In one implementation, the second DC/DC converter 1230 may be a unidirectional DC/DC converter.

In another implementation, given that the battery releases the power into the energy storage unit, since the power that can be stored by the energy storage power source is limited, the power of the energy storage unit may reach full capacity, resulting in the battery being unable to release the power. Thus, referring again to FIG. 14, the second DC/DC converter 1230 may be a bidirectional DC/DC converter.

In this case, in addition to controlling the second DC/DC converter 1230 to discharge the power of the battery into the energy storage unit 1240, the control unit 1110 may control the second DC/DC converter 1230 to charge the battery through the energy storage unit 1240 while controlling the unidirectional AC/DC converter 1210 and the first DC/DC converter 1220 to charge the battery through the AC power source based on the first charging current. Or, the control unit 1110 may also control the second DC/DC converter 1230 to charge the battery through the energy storage unit 1240 while controlling the unidirectional AC/DC converter 1210 and the first DC/DC converter 1220 to charge the battery through the AC power source based on the second charging current.

According to the above technical solution, the energy storage unit can not only receive the power released by the battery, but can also charge the battery. On the one hand, it avoids the problem of not being able to continue releasing the power from the battery to the energy storage unit because the power in the energy storage unit has reached the full amount, and ensures that the charging process is carried out normally. On the other hand, the energy storage unit charges the battery by using the received power released by the battery, which realizes the recycling of the battery power and saves electric energy. On yet another hand, the AC power source and the energy storage unit charge the battery at the same time, which is beneficial to improve the charging rate of the battery and save the charging time.

Optionally, the first charging current and the current at which the energy storage unit 1240 charges the battery may be different, and similarly, the second charging current may be different from the current at which the energy storage unit 1240 charges the battery. Illustratively, the first charging current may be greater than the current at which the energy storage unit 1240 charges the battery. For example, the charging rate at which the energy storage unit 1240 charges the battery may be less than 0.5 C1, C1 is the capacity of the energy storage unit 1240.

When charging a battery based on the power conversion unit 1120 of FIG. 14, as a possible embodiment, under any conditions, the control unit 1110 may control the unidirectional AC/DC converter 1210 and the first DC/DC converter 1220 to charge the battery through an AC power source, and control the second DC/DC converter 1230 to charge the battery through the energy storage unit 1240.

In another possible embodiment, the control unit 1110 may first acquire the SOC of the energy storage unit 1240, and then determine the AC power source to charge the battery based on the SOC of the energy storage unit 1240, or determine that the AC power source and the energy storage unit 1240 charge the battery simultaneously based on the SOC of the energy storage unit 1240.

Optionally, the energy storage unit 1240 may send a first message including the SOC of the energy storage unit 1240 to the control unit 1110, so that the control unit 1110 may acquire the SOC of the energy storage unit 1240.

Optionally, the energy storage unit 1240 may store the SOC to the cloud such that the control unit 1110 may acquire the SOC of the energy storage unit 1240 from the cloud.

Specifically, if the SOC of the energy storage unit 1240 is greater than or equal to the state of charge threshold, the control unit 1110 may control not only the unidirectional AC/DC converter 1210 and the first DC/DC converter 1220 to charge the battery through the AC power source, but also the second DC/DC converter 1230 to charge the battery through the energy storage unit 1240.

If the SOC of the energy storage unit 1240 is less than the state of charge threshold, the control unit 1110 may control only the unidirectional AC/DC converter 1210 and the first DC/DC converter 1220 to charge the battery through the AC power source. Optionally, when the SOC of the energy storage unit 1240 is less than the state of charge threshold, the control unit 1110 may send a charging request message to other devices to cause other devices to charge the energy storage unit 1240 until the SOC of the energy storage unit 1240 is greater than or equal to the state of charge threshold. After that, the AC power source and the energy storage unit 1240 can charge the battery at the same time.

The state of charge threshold can be a fixed value. Optionally, the state of charge threshold can be a variable. For example, the state of charge threshold can vary with time, environment (such as temperature) and other factors.

The state of charge threshold may be preset on the control unit 1110 or may be sent to the control unit 1110 by the energy storage unit.

According to the above technical solution, whether the energy storage unit is used to assist the AC power source to charge the battery together is determined according to the SOC of the energy storage unit, so that the charging efficiency of the charging and discharging device can be improved when the power stored by the energy storage unit is sufficient.

In the process of simultaneously charging the battery by the AC power source and the energy storage unit 1240, the first charging power for charging the battery by the energy storage unit 1240 is W1, and the second charging power for charging the battery by the AC power source is W2, W3 is a difference between the charging demand power of the battery and W1. Optionally, the first charging power W1 may be determined prior to the second charging power W2.

W1 may be determined according to the discharge capability of the energy storage unit 1240. In addition, W1 may also be determined according to the state of the energy storage unit 1240 at the current time, for example, the ampere-hour of the energy storage unit 1240, the temperature of the energy storage unit 1240, and the like.

Optionally, the AC power source includes, but is not limited to, a power grid that can be used to provide three-phase AC power, and the power grid can not only provide enough power to charge the battery, but also receive more power released by the battery.

Optionally, in other implementations, the AC power source may also be a single-phase AC power source. Embodiments of the present application are not limited to specific types of AC power sources.

In addition, the related technical solutions of charging current, discharging current, cumulative charge amount, cumulative discharge amount, cumulative charge amount threshold, cumulative discharge amount threshold and the like in the embodiments of the present application can be referred to the relevant description above, and will not be repeated here.

Figure 15:
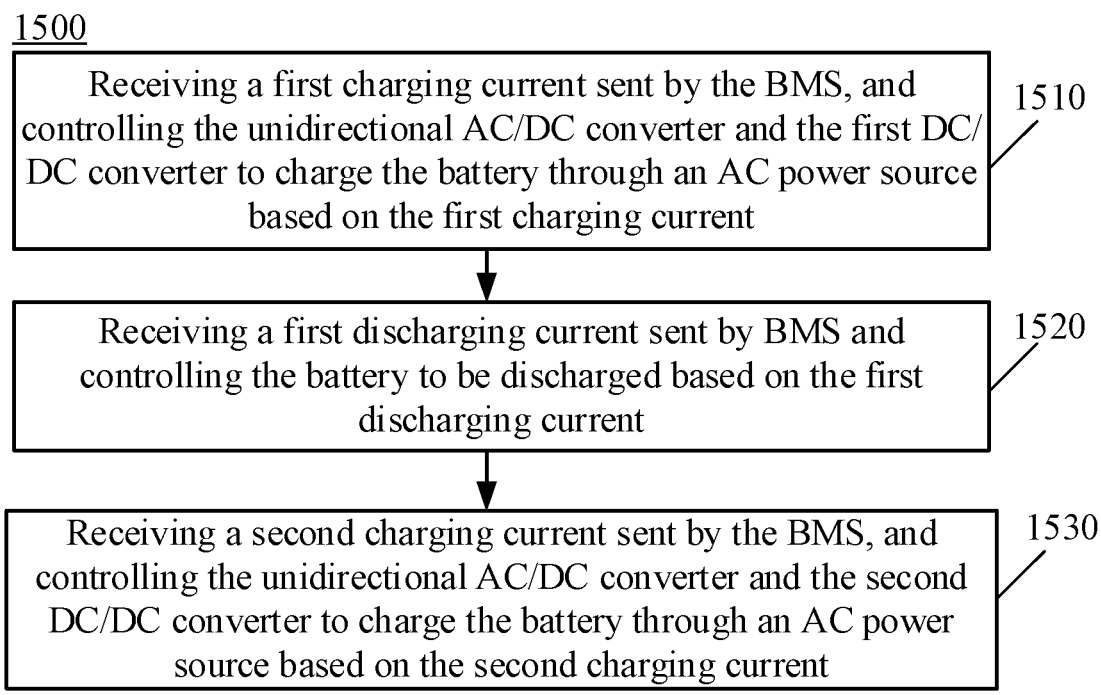
FIG. 15 is a schematic flow diagram of a battery charging method according to embodiments of the present application.

FIG. 15 illustrates a schematic flow diagram of a method 1500 for charging battery of embodiments of the present application. The method 1500 may be applied to a charging and discharging device including a first direct current/direct current DC/DC converter and a unidirectional alternating current/direct current AC/DC converter, for example, may be applied to a charging and discharging device including a unidirectional AC/DC converter 1210 and a first DC/DC converter 1220 in FIG. 12. It should be understood that method embodiments and device embodiments correspond to each other, and the similar descriptions may refer to the device embodiments.

As shown in FIG. 15, the method 1500 for charging battery 1500 may include the following steps:

in 1510, receiving a first charging current sent by the BMS, and controlling the unidirectional AC/DC converter and the first DC/DC converter to charge the battery through an AC power source based on the first charging current:

in 1520, receiving a first discharging current sent by the BMS, and controlling the battery to release power based on the first discharging current, where the first discharging current is a discharging current sent by the BMS when a first cumulative charge amount of the battery is greater than or equal to a first cumulative charge amount threshold and a voltage of a battery cell of the battery does not exceed a full charge voltage of the battery cell; and in 1530, receiving a second charging current sent by the BMS, and controlling the unidirectional AC/DC converter and the first DC/DC converter to charge the battery through the AC power source based on the second charging current, where the second charging current is a charging current sent by the BMS when a first cumulative discharge amount of the battery is greater than or equal to a first cumulative discharge amount threshold.

Optionally, in some embodiments, the method 1500 further includes receiving a second discharging current sent by the BMS, and controlling the battery to release power based on the second discharging current, where the second discharging current is a discharging current sent by the BMS when a second cumulative charge amount of the battery is greater than or equal to a second cumulative charge amount threshold and the voltage of the battery cell of the battery does not exceed the full charge voltage of the battery cell.

Optionally, in some embodiments, the method 1500 further includes receiving a charge stop command sent by the BMS: and controlling, based on the charge stop command, the unidirectional AC/DC converter and the first DC/DC converter to cause the AC power source to stop charging the battery, where the charge stop command is a command sent by the BMS when the voltage of the battery cell of the battery exceeds the full charge voltage.

Optionally, in some embodiments, the charging and discharging device further includes a second DC/DC converter such as the second DC/DC converter 1230 in FIGS. 13 and 14. Controlling the battery to release power based on the first discharging current includes controlling the second DC/DC converter to release the power of the battery into an energy storage unit based on the first discharging current.

Optionally, in some embodiments, the second DC/DC converter is a bidirectional DC/DC converter, and the method 1500 further includes controlling the second DC/DC converter to charge the battery through the energy storage unit while controlling the unidirectional AC/DC converter and the first DC/DC converter to charge the battery through the AC power source based on the first charging current; and/or controlling the second DC/DC converter to charge the battery through the energy storage unit when controlling the unidirectional AC/DC converter and the first DC/DC converter to charge the battery through the AC power source based on the second charging current.

Optionally, in some possible embodiments, a first charging power of the energy storage unit to charge the battery is determined according to a discharge capability of the energy storage unit, and a second charging power of the AC power source to charge the battery is a difference between a charging demand power of the battery and the first charging power.

Optionally, in some embodiments, charging the battery includes: acquiring a battery state of charge SOC value of the energy storage unit: under a condition that the SOC is greater than a SOC threshold, controlling the second DC/DC converter to charge the battery through the energy storage unit, and controlling the unidirectional AC/DC converter and the first DC/DC converter to charge the battery through the AC power source based on the first charging current: and/or under a condition that the SOC is greater than a SOC threshold, controlling the second DC/DC converter to charge the battery through the energy storage unit and controlling the unidirectional AC/DC converter, the first DC/DC converter to charge the battery through the AC power source based on the second charging current.

Optionally, in some embodiments, the charging rate of the first charging current and/or the second charging current ranges from 2C to 10C.

Optionally, in some embodiments, the discharging rate of the first discharging current ranges from 0.1 C to 1 C.

Optionally, in some embodiments, the ratio of the first cumulative discharge amount threshold to the first cumulative charge amount threshold is less than or equal to 10%.

Optionally, in some embodiments, at least one of the first charging current, the first discharging current, and the second charging current is determined according to a state parameter of the battery; where the state parameter of the battery includes at least one of a battery temperature, a battery voltage, a battery current, a battery state of charge, and a battery state of health.

Optionally, in some embodiments, receiving a first charging current sent by the BMS of the battery includes periodically receiving the first charging current sent by the BMS: and/or, receiving the first discharging current sent by the BMS includes: periodically receiving the first discharging current sent by the BMS: and/or, receiving the second charging current sent by the BMS includes periodically receiving the second charging current sent by the BMS.

Optionally, in some embodiments, the method 1500 further includes receiving a first charging voltage sent by the BMS, where the first charging voltage and the first charging current are carried in the first BCL message: and/or receiving a first discharging voltage sent by the BMS, where the first discharging voltage and the first discharging current are carried in the second BCL message: and/or, receiving a second charging voltage sent by the BMS, where the second charging voltage and the second charging current are carried in the third BCL message.

Figure 16:
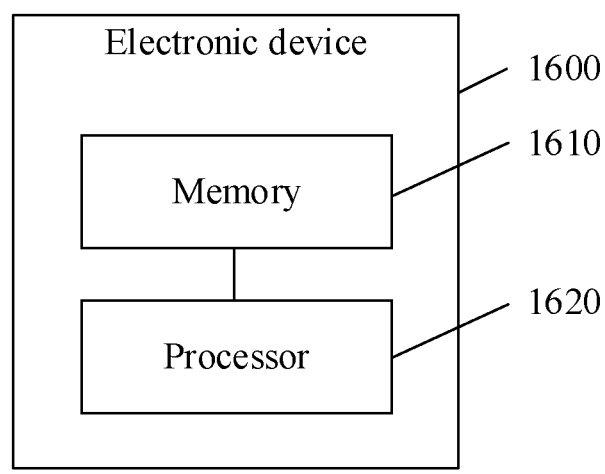
FIG. 16 is a schematic structural block diagram of an electronic device according to one embodiment of the present application.

FIG. 16 shows a schematic structural block diagram of an electronic device 1600 of one embodiment of the present application. As shown in FIG. 16, the electronic device 1600 includes a memory 1610 and a processor 1620. The memory 1610 is used for storing a computer program, and the processor 1620 is used for reading the computer program and executing the methods of various embodiments of the present application described above based on the computer program.

Optionally, the electronic device 1600 may be used for any one or more of a BMS and a charge-discharge device. In the embodiments of the present application, in addition to the processor in the charging and discharging device reading the corresponding computer program and executing the charging method corresponding to the charging and discharging device in the aforementioned various embodiments based on the computer program, the processor in the BMS can also read the corresponding computer program and execute the charging method corresponding to the BMS in the aforementioned various embodiments based on the computer program.

In addition, the embodiment of the present application also provides a readable storage medium for storing a computer program, and the computer program is used for executing the aforementioned methods of various embodiments of the present application. Optionally, the computer program may be a computer program in the charging and discharging device and/or BMS.

It should be understood that the specific examples herein are only intended to assist those skilled in the art to better understand the embodiments of the present application and are not intended to limit the scope of the embodiments of the present application.

It should also be understood that in various embodiments of the present application, the serial number of each process does not mean the sequence of execution, and the execution sequence of each process should be determined by its function and internal logic, and should not constitute any limitation on the implementation process of the embodiments of the present application.

It should also be understood that the various embodiments described in this specification may be implemented individually or in combination, and the embodiments of this application are not limited thereto.

Although the present application has been described with reference to preferred embodiments various modifications may be made thereto and components therein may be replaced with equivalents without departing from the scope of the present application. In particular, the various technical features mentioned in the various embodiments may be combined in any manner so long as there is no structural conflict. The present application is not limited to the specific embodiments disclosed herein but includes all technical solutions falling within the scope of the claims.

What is claimed is:

1. A charging and discharging device, comprising a first direct current/direct current (DC/DC) converter, a unidirectional alternating current/direct current (AC/DC) converter and a control unit, the first DC/DC converter being a unidirectional DC/DC converter, and the control unit being configured to:

receive a first charging current sent by a battery management system (BMS) of a battery, and control the unidirectional AC/DC converter and the first DC/DC converter to charge the battery through an alternative current (AC) power source based on the first charging current;

receive a first discharging current sent by the BMS, and control the battery to release power based on the first discharging current, wherein the first discharging current is a discharging current sent by the BMS when a first cumulative charge amount of the battery is greater than or equal to a first cumulative charge amount threshold and a voltage of a battery cell of the battery does not exceed a full charge voltage of the battery cell; and receive a second charging current sent by the BMS, and control the unidirectional AC/DC converter and the first DC/DC converter to charge the battery through the AC power source based on the second charging current, wherein the second charging current is a charging current sent by the BMS when a first cumulative discharge amount of the battery is greater than or equal to a first cumulative discharge amount threshold.

2. The charging and discharging device according to claim 1, wherein the control unit is further configured to:
receive a second discharging current sent by the BMS, and control the battery to release power based on the second discharging current, wherein the second discharging current is a discharging current sent by the BMS when a second cumulative charge amount of the battery is greater than or equal to a second cumulative charge amount threshold and the voltage of the battery cell of the battery does not exceed the full charge voltage of the battery cell.

3. The charging and discharging device according to claim 1, wherein the control unit is further configured to:
receive a charge stop command sent by the BMS; and control, based on the charge stop command, the unidirectional AC/DC converter and the first DC/DC converter to cause the AC power source to stop charging the battery, wherein the charge stop command is a command sent by the BMS when the voltage of the battery cell of the battery exceeds the full charge voltage.

4. The charging and discharging device according to claim 1, wherein the charging and discharging device further comprises a second DC/DC converter; and
the control unit is specifically configured to:
control, based on the first discharging current, the second DC/DC converter to release the power of the battery into an energy storage unit.

5. The charging and discharging device according to claim 4, wherein the second DC/DC converter is a bidirectional DC/DC converter, and the control unit is further configured to:
control the second DC/DC converter to charge the battery through the energy storage unit while controlling the unidirectional AC/DC converter and the first DC/DC converter to charge the battery through the AC power source based on the first charging current; and/or
control the second DC/DC converter to charge the battery through the energy storage unit while controlling the unidirectional AC/DC converter and the first DC/DC converter to charge the battery through the AC power source based on the second charging current.

6. The charging and discharging device according to claim 5, wherein a first charging power of the energy storage unit to charge the battery is determined according to a discharge capability of the energy storage unit, and a second charging power of the AC power source to charge the battery is a difference between a charging demand power of the battery and the first charging power.

7. The charging and discharging device according to claim 5, wherein the control unit is specifically configured to:
acquire a battery state of charge (SOC) of the energy storage unit;
under a condition that the SOC is greater than a SOC threshold, control the second DC/DC converter to charge the battery through the energy storage unit, and control the unidirectional AC/DC converter and the first DC/DC converter to charge the battery through the AC power source based on the first charging current; and/or
under a condition that the SOC is greater than a SOC threshold, control the second DC/DC converter to charge the battery through the energy storage unit, and control the unidirectional AC/DC converter and the first DC/DC converter to charge the battery through the AC power source based on the second charging current.

8. The charging and discharging device according to claim 1, wherein a charging rate of the first charging current and/or the second charging current ranges from 2C to 10C.

9. The charging and discharging device according to claim 1, wherein a discharging rate of the first discharging current ranges from 0.1C to 1C.

10. The charging and discharging device according to claim 1, wherein a ratio of the first cumulative discharge amount threshold to the first cumulative charge amount threshold is less than or equal to 10%.

11. A method for charging a battery, is the method being applied to a charging and discharging device comprising a first direct current/direct current (DC/DC) converter, a unidirectional alternating current/direct current (AC/DC) converter, the first DC/DC converter being a unidirectional DC/DC converter, and comprising:
receiving a first charging current sent by a battery management system (BMS) of a battery, and controlling the unidirectional AC/DC converter and the first DC/DC converter to charge the battery through an alternative current (AC) power source based on the first charging current;
receiving a first discharging current sent by the BMS, and controlling the battery to release power based on the first discharging current, wherein the first discharging current is a discharging current sent by the BMS when a first cumulative charge amount of the battery is greater than or equal to a first cumulative charge amount threshold and a voltage of a battery cell of the battery does not exceed a full charge voltage of the battery cell; and
receiving a second charging current sent by the BMS, and controlling the unidirectional AC/DC converter and the first DC/DC converter to charge the battery through the AC power source based on the second charging current, wherein the second charging current is a charging current sent by the BMS when a first cumulative discharge amount of the battery is greater than or equal to a first cumulative discharge amount threshold.

12. The method according to claim 11, wherein the method further comprises:

receiving a second discharging current sent by the BMS, and controlling the battery to release power based on the second discharging current, wherein the second discharging current is a discharging current sent by the BMS when a second cumulative charge amount of the battery is greater than or equal to a second cumulative charge amount threshold and the voltage of the battery cell of the battery does not exceed the full charge voltage of the battery cell.

13. The method according to claim 11, wherein the method further comprises:
receiving a charge stop command sent by the BMS; and
controlling, based on the charge stop command, the unidirectional AC/DC converter and the first DC/DC converter to cause the AC power source to stop charging the battery, wherein the charge stop command is a command sent by the BMS when the voltage of the battery cell of the battery exceeds the full charge voltage.

14. The method according to claim 11, wherein the charging and discharging device further comprises a second DC/DC converter, and wherein the controlling the battery to release power based on the first discharging current comprises:
controlling, based on the first discharging current, the second DC/DC converter to release the power of the battery into an energy storage unit.

15. The method according to claim 14, wherein the second DC/DC converter is a bidirectional DC/DC converter, and wherein method further comprises:
controlling the second DC/DC converter to charge the battery through the energy storage unit while controlling the unidirectional AC/DC converter and the first DC/DC converter to charge the battery through the AC power source based on the first charging current; and/or
controlling the second DC/DC converter to charge the battery through the energy storage unit while controlling the unidirectional AC/DC converter and the first DC/DC converter to charge the battery through the AC power source based on the second charging current.

16. The method according to claim 15, wherein a first charging power of the energy storage unit to charge the battery is determined according to a discharge capability of the energy storage unit, and a second charging power of the AC power source to charge the battery is a difference between a charging demand power of the battery and the first charging power.

17. The method according to claim 15, wherein the charging the battery comprises:
acquiring a battery state of charge (SOC) of the energy storage unit;
under a condition that the SOC is greater than a SOC threshold, controlling the second DC/DC converter to charge the battery through the energy storage unit, and controlling the unidirectional AC/DC converter and the first DC/DC converter to charge the battery through the AC power source based on the first charging current; and/or
under a condition that the SOC is greater than a SOC threshold, controlling the second DC/DC converter to charge the battery through the energy storage unit, and controlling the unidirectional AC/DC converter and the first DC/DC converter to charge the battery through the AC power source based on the second charging current.

18. The method according to claim 11, wherein a charging rate of the first charging current and/or the second charging current ranges from 2C to 10C.

19. The method according to claim 11, wherein a discharging rate of the first discharging current ranges from 0.1C to 1C, and a ratio of the first cumulative discharge amount threshold to the first cumulative charge amount threshold is less than or equal to 10%.

20. A charging and discharging device, comprising: a processor and a memory, the memory being configured to store a computer program, and the processor being configured to call the computer program to execute the method for charging the battery of claim 11.

* * * * *